United States Patent
Muinonen et al.

(10) Patent No.: US 8,332,086 B2
(45) Date of Patent: Dec. 11, 2012

(54) SYSTEM AND METHOD FOR FORECASTING THE COMPOSITION OF AN OUTBOUND TRAIN IN A SWITCHYARD

(75) Inventors: Kari Muinonen, Roxboro (CA); Vincent Morency, St-Bruno-de-Montarville (CA); Matthew Barker, Sherwood Park (CA)

(73) Assignee: Canadian National Railway Company, Montreal, Quebec (CA)

( * ) Notice: Subject to any disclaimer, the term of this patent is extended or adjusted under 35 U.S.C. 154(b) by 0 days.

(21) Appl. No.: 13/249,487

(22) Filed: Sep. 30, 2011

(65) Prior Publication Data

US 2012/0022729 A1 Jan. 26, 2012

Related U.S. Application Data

(63) Continuation of application No. 11/702,864, filed on Feb. 6, 2007, now Pat. No. 8,060,263, which is a continuation-in-part of application No. 11/601,338, filed on Nov. 17, 2006, now Pat. No. 8,055,397, and a continuation-in-part of application No. 11/387,347, filed on Mar. 23, 2006.

(60) Provisional application No. 60/754,601, filed on Dec. 30, 2005.

(51) Int. Cl.
*G05D 1/00* (2006.01)
*G05D 3/00* (2006.01)

(52) U.S. Cl. 701/19; 104/26.1; 104/88.02; 246/182 AB; 705/7.12

(58) Field of Classification Search .............. 701/19; 104/26.1, 88.02; 246/182 AB; 705/7.12
See application file for complete search history.

(56) References Cited

U.S. PATENT DOCUMENTS

| 1,681,131 A | 8/1928 | Prescott |
| 2,045,695 A | 6/1936 | Brown |
| 2,910,578 A | 10/1959 | Karlet et al. |
| 3,307,031 A | 2/1967 | Frielinghaus et al. |
| 3,316,400 A | 4/1967 | Dosch et al. |
| 3,480,773 A | 11/1969 | McCune et al. |
| 3,483,367 A | 12/1969 | McCune et al. |

(Continued)

FOREIGN PATENT DOCUMENTS

CA 1 253 244 A1 4/1989

(Continued)

OTHER PUBLICATIONS

Shiwei He, et al; "Optimal Computer-Aided Dispatching Model of Decision Support System in Railyards", 1997 IEEE International Conference on Intelligent Processing Systems, Oct. 28-31, 1997, Beijing, China, vol. 2, pp. 1546-1550.*

(Continued)

*Primary Examiner* — Cuong H Nguyen
(74) *Attorney, Agent, or Firm* — Ladas & Parry LLP

(57) ABSTRACT

A system for forecasting the outbound workload in a switchyard. The system has a processing entity for which receives information on railcar traffic for handling by the switchyard, wherein the railcar traffic includes railcars that are yet to be switched into classification tracks of the switchyard. For every departure train of two or more departure trains, the processing entity applies logic rules to the information to compute a forecast of railcar traffic that will be available to the departure train for transport out of the switchyard. An output releases data derived from the forecast of railcar traffic, describing the traffic available for each train of the two or more departure trains.

39 Claims, 13 Drawing Sheets

U.S. PATENT DOCUMENTS

| | | | |
|---|---|---|---|
| 3,543,020 | A | 11/1970 | McGlumphy et al. |
| 3,598,990 | A | 8/1971 | Convey |
| 3,727,559 | A | 4/1973 | McCune et al. |
| 3,736,420 | A | 5/1973 | Elder et al. |
| 3,861,316 | A | 1/1975 | Yamazaki et al. |
| 3,865,042 | A | 2/1975 | DePaola et al. |
| 3,944,986 | A | 3/1976 | Staples |
| 3,946,973 | A | 3/1976 | Budway et al. |
| 4,028,531 | A | 6/1977 | Cottin et al. |
| 4,034,677 | A | 7/1977 | Frank |
| 4,151,969 | A | 5/1979 | Wood |
| 4,361,300 | A | 11/1982 | Rush |
| 4,610,206 | A | 9/1986 | Kubala et al. |
| 4,883,245 | A | 11/1989 | Erickson, Jr. |
| 5,129,605 | A | 7/1992 | Burns et al. |
| 5,465,926 | A | 11/1995 | Brown |
| 5,499,583 | A | 3/1996 | Blumel |
| 5,623,413 | A | 4/1997 | Matheson et al. |
| 5,685,507 | A | 11/1997 | Horst et al. |
| 5,758,848 | A | 6/1998 | Beule |
| 5,794,172 | A | 8/1998 | Matheson et al. |
| 6,076,067 | A | 6/2000 | Jacobs et al. |
| 6,135,396 | A | 10/2000 | Whitfield et al. |
| 6,154,735 | A | 11/2000 | Crone |
| 6,304,801 | B1 * | 10/2001 | Doner ............. 701/19 |
| 6,377,877 | B1 * | 4/2002 | Doner ............. 701/19 |
| 6,397,130 | B1 | 5/2002 | Carr et al. |
| 6,418,854 | B1 * | 7/2002 | Kraft ............. 104/26.1 |
| 6,449,536 | B1 | 9/2002 | Brousseau et al. |
| 6,516,727 | B2 | 2/2003 | Kraft |
| 6,519,595 | B1 | 2/2003 | Rose |
| 6,587,738 | B1 | 7/2003 | Belcea |
| 6,637,343 | B2 | 10/2003 | Stephan et al. |
| 6,766,228 | B2 | 7/2004 | Chirescu |
| 6,789,005 | B2 | 9/2004 | Hawthorne |
| 6,832,204 | B1 | 12/2004 | Doner |
| 6,856,865 | B2 | 2/2005 | Hawthorne |
| 6,876,300 | B2 | 4/2005 | Ponziani |
| 6,903,658 | B2 | 6/2005 | Kane et al. |
| 6,961,682 | B2 * | 11/2005 | Doner ............. 703/2 |
| 6,978,195 | B2 | 12/2005 | Kane et al. |
| 7,006,957 | B2 | 2/2006 | Doner |
| 7,239,943 | B2 | 7/2007 | Peltz |
| 7,350,754 | B2 | 4/2008 | Pierson |
| 7,353,093 | B2 | 4/2008 | Bamfield et al. |
| 7,428,453 | B2 | 9/2008 | Davenport et al. |
| 7,433,766 | B2 | 10/2008 | Ruckser |
| 7,441,506 | B2 | 10/2008 | Bruns |
| 7,457,691 | B2 | 11/2008 | Muinonen et al. |
| 7,546,185 | B2 | 6/2009 | Muinonen et al. |
| 7,657,348 | B2 | 2/2010 | Muinonen et al. |
| 7,751,952 | B2 * | 7/2010 | Muinonen et al. ............. 701/19 |
| 7,792,616 | B2 * | 9/2010 | Muinonen et al. ............. 701/19 |
| 7,813,846 | B2 | 10/2010 | Wills et al. |
| 7,818,101 | B2 * | 10/2010 | Muinonen et al. ............. 701/19 |
| 7,831,342 | B2 * | 11/2010 | Muinonen et al. ............. 701/19 |
| 7,885,736 | B2 * | 2/2011 | Muinonen et al. ............. 701/19 |
| 7,937,193 | B2 | 5/2011 | Philp et al. |
| 7,983,806 | B2 * | 7/2011 | Muinonen et al. ............. 701/19 |
| 8,019,497 | B2 * | 9/2011 | Muinonen et al. ............. 701/19 |
| 8,055,397 | B2 * | 11/2011 | Pathak et al. ............. 701/19 |
| 8,060,263 | B2 * | 11/2011 | Muinonen et al. ............. 701/19 |
| 8,112,189 | B2 * | 2/2012 | Peltz et al. ............. 701/19 |
| 2001/0034642 | A1 | 10/2001 | Doner |
| 2002/0045975 | A1 | 4/2002 | Carr et al. |
| 2002/0082814 | A1 | 6/2002 | Doner |
| 2002/0096081 | A1 | 7/2002 | Kraft |
| 2002/0128757 | A1 | 9/2002 | Chirescu |
| 2002/0173884 | A1 | 11/2002 | Clawson |
| 2003/0040853 | A1 | 2/2003 | Brousseau et al. |
| 2003/0093195 | A1 | 5/2003 | Ishikawa |
| 2003/0105561 | A1 | 6/2003 | Nickles et al. |
| 2003/0178534 | A1 | 9/2003 | Peltz et al. |
| 2003/0236598 | A1 | 12/2003 | Villarreal Antelo et al. |
| 2004/0015276 | A1 | 1/2004 | Kane et al. |
| 2004/0030466 | A1 | 2/2004 | Rezk |
| 2004/0104784 | A1 | 6/2004 | Enriquez |
| 2004/0111309 | A1 | 6/2004 | Matheson et al. |
| 2004/0167687 | A1 | 8/2004 | Kornick et al. |
| 2005/0209777 | A1 | 9/2005 | Peltz |
| 2005/0240289 | A1 | 10/2005 | Hoyte et al. |
| 2005/0240545 | A1 | 10/2005 | Schachtely et al. |
| 2005/0262236 | A1 | 11/2005 | Schachtely et al. |
| 2006/0027133 | A1 | 2/2006 | Suematsu |
| 2006/0212184 | A1 | 9/2006 | Philp et al. |
| 2007/0005200 | A1 | 1/2007 | Wills et al. |
| 2007/0150130 | A1 | 6/2007 | Welles et al. |
| 2007/0156300 | A1 | 7/2007 | Muinonen et al. |
| 2007/0156302 | A1 | 7/2007 | Muinonen et al. |
| 2007/0156303 | A1 | 7/2007 | Muinonen et al. |
| 2007/0156304 | A1 | 7/2007 | Muinonen et al. |
| 2007/0156307 | A1 | 7/2007 | Muinonen et al. |
| 2007/0156309 | A1 | 7/2007 | Muinonen et al. |
| 2007/0179688 | A1 | 8/2007 | Muinonen et al. |
| 2007/0299570 | A1 | 12/2007 | Muinonen et al. |
| 2008/0119973 | A1 | 5/2008 | Pathak et al. |
| 2010/0026570 | A1 | 2/2010 | Amidi |
| 2010/0114810 | A1 | 5/2010 | Hoyte et al. |
| 2010/0222948 | A1 | 9/2010 | Muinonen et al. |
| 2010/0235021 | A1 | 9/2010 | Muinonen et al. |
| 2011/0017693 | A1 | 1/2011 | Thomas et al. |

FOREIGN PATENT DOCUMENTS

| | | | |
|---|---|---|---|
| CA | 1 269 749 | A1 | 5/1990 |
| CA | 1 293 960 | C | 1/1992 |
| CA | 2 198 855 | C | 3/1996 |
| CA | 2 143 875 | C | 9/1996 |
| CA | 2 175 776 | C | 8/1997 |
| CA | 2 196 631 | C | 9/1997 |
| CA | 2 279 528 | A1 | 8/1998 |
| CA | 2 281 604 | A1 | 8/1998 |
| CA | 2 281 683 | A1 | 8/1998 |
| CA | 2 291 057 | A1 | 11/1998 |
| CA | 2 392 972 | A1 | 3/2001 |
| CA | 2 395 062 | A1 | 7/2001 |
| CA | 2 395 064 | A1 | 7/2001 |
| CA | 2 395 065 | A1 | 7/2001 |
| CA | 2 395 395 | A1 | 7/2001 |
| CA | 2 395 821 | A1 | 7/2001 |
| CA | 2 356 760 | A1 | 3/2002 |
| CA | 2 364 152 | A1 | 5/2002 |
| CA | 2 364 153 | A1 | 5/2002 |
| CA | 2 364 155 | A1 | 5/2002 |
| CA | 2 364 157 | A1 | 5/2002 |
| CA | 2 429 520 | A1 | 5/2002 |
| CA | 2 431 868 | A1 | 7/2002 |
| CA | 2 413 080 | A1 | 8/2002 |
| CA | 2 433 737 | A1 | 8/2002 |
| CA | 2 374 166 | A1 | 9/2002 |
| CA | 2 476 400 | A1 | 8/2003 |
| CA | 2 484 720 | A1 | 11/2003 |
| CA | 2 486 532 | A1 | 11/2003 |
| CA | 2 494 145 | A1 | 2/2004 |
| CA | 2 449 181 | A1 | 5/2004 |
| CA | 2 500 797 | A1 | 5/2004 |
| CA | 2 454 739 | A1 | 7/2004 |
| CA | 2 459 212 | A1 | 8/2004 |
| CA | 2 459 213 | A1 | 8/2004 |
| CA | 2 431 636 | A1 | 12/2004 |
| CN | 1176907 | A | 3/1998 |
| DE | 10194720 | | * 11/2004 |
| EP | 1 490 253 | | 12/2004 |
| EP | 2 310 871 | A2 | 4/2011 |
| JP | 05-278504 | A | 10/1993 |
| JP | 2000255418 | A * | 9/2000 |
| JP | 2002183258 | A * | 6/2002 |
| JP | 2004-359154 | A | 12/2004 |
| JP | 2011-159140 | A | 8/2011 |
| WO | WO 0149547 | A1 * | 7/2001 |
| WO | 02/42142 | A1 | 5/2002 |
| WO | 03/070537 | A1 | 8/2003 |
| WO | 03/090397 | A2 | 10/2003 |
| WO | 2004/074067 | A1 | 9/2004 |
| WO | 2004/074068 | A1 | 9/2004 |
| WO | 2006/099387 | A2 | 9/2006 |
| WO | 2007/149629 | A1 | 12/2007 |

| | | |
|---|---|---|
| WO | 2010/014493 A2 | 2/2010 |
| WO | 2010/063245 A2 | 6/2010 |
| WO | 2012/017550 A1 | 2/2012 |

OTHER PUBLICATIONS

Roger D. Burns, et al "Safety and Productivity Improvement of Railroad Operations by Advanced Train Control Systems", Railroad Conference, 1989 Proceedings, Technical Papers presented at the 1989 IEEE/ASME Joint: Apr. 25-27, 1989; pp. 33-38.*

Donald E. Brown, et al; "Rail Network Routing and Scheduling Using Simulated Annealing", IEEE International Conference on Man and Cybernetics, Oct. 18-21, 1992, vol. 1, pp. 589-592.*

Rynsord: a novel decentralized algorithm for railway networks with "soft reservation"; Lee, T.S.; Ghosh, S.; Vehicular Technology, IEEE Transactions on; vol. 47, Issue 4, Nov. 1998 pp. 1350-1364; Digital Object Identifier 10.1109/25.728526.*

Improvement of Freight Train Timetable for Single-Track Railway System; Ke, Bwo-Ren; Lin, Chun-Liang; Chien, Hsien-Hung Computer, Consumer and Control (IS3C), 2012 International Symposium on; Digital Object Identifier: 10.1109/IS3C.2012.121 Publication Year: 2012, pp. 456-459.*

Iteration-Shared Scheduling Algorithms Abolishing the Departure-Time-Compatible Graph in Switch-Memory-Switch Switches Yang Xu; Bin Liu; Gao Xia; Dong Lin; INFOCOM 2007. 26th IEEE International Conference on Computer Communications. IEEE Digital Object Identifier: 10.1109/INFCOM.2007.190; Publication Year: 2007, pp. 1622-1630.*

Research on Optimization Model of Initial Schedule of Passenger Trains Based on Improved Genetic Algorithm; Ni Shaoquan; Chen Dingjun; Lv Miaomiao; Intelligent Computation Technology and Automation, 2009. ICICTA '09. Second International Conference on vol. 3 ;Dig.Obj. Id.: 10.1109/ICICTA.2009.533; Pub. Year: 2009, pp. 273-276.*

A real-time software controller for a digital model railroad system; Webster, R.W.; Hess, D.; Real-Time Applications, 1993., Proceedings of the IEEE Workshop on; Digital Object Identifier: 10.1109/RTA.1993.263102; Publication Year: 1993, pp. 126-130.*

USPTO NFOA mailed Dec. 23, 2011 in connection with U.S. Appl. No. 12/780,215.

USPTO NOA mailed Mar. 11, 2009 in connection with U.S. Appl. No. 11/387,833.

USPTO RR mailed Dec. 5, 2011 in connection with U.S. Appl. No. 12/784,019.

USPTO RR mailed Jan. 18, 2012 in connection with U.S. Appl. No. 12/870,081.

USPTO NFOA mailed Feb. 7, 2012 in connection with U.S. Appl. No. 11/387,347.

USPTO Supplemental NOA mailed Sep. 8, 2010 in connection with U.S. Appl. No. 12/436,254.

USPTO NOA mailed Jul. 2, 2010 in connection with U.S. Appl. No. 12/436,254.

USPTO NOA mailed Sep. 29, 2010 in connection with U.S. Appl. No. 12/778,356.

USPTO RR mailed Sep. 8, 2011 in connection with U.S. Appl. No. 12/780,215.

USPTO NFOA mailed Fe. 15, 2012 in connection with U.S. Appl. No. 12/784,019.

USPTO NFOA mailed Mar. 1, 2012 in connection with U.S. Appl. No. 12/874,589.

USPTO NFOA mailed Apr. 4, 2012 in connection with U.S. Appl. No. 12/870,081.

USPTO NOA mailed Apr. 6, 2012 in connection with U.S. Appl. No. 13/273,599.

Beth C. Kulick, et al; "A Flexible Interface and Architecture for Container and Intermodal Freight Simulations", Proceedings of the 1999 Winter Simulation Conference, Dec. 5-8, 1999, vol. 2, pp. 1238-1242.

Shiwei He, et al; "Optimal Computer-Aided Dispatching Model of Decision Support System in Railyards", 1997 IEEE Conference on Intelligent Processing Systems, Oct. 28-31, Beijing, China, vol. 2, pp. 1546-1550.

Roger D. Burns, et al; "Safety and Productivity Improvement of Railroad Operations by Advanced Train Control Systems", Railroad Conference, 1989 Proceedings, Technical Papers presented at the 1989 IEEE/ASME Joint: Apr. 25-27, 1989, pp. 33-38.

Tony S. Lee, et al; "RYNSORD: A Novel Decentralized Algorithm for Railway Networks with Soft Reservation", IEEE Transactions on Vehicular Technology, vol. 47, No. 4, Nov. 1998, pp. 1350-1364.

Chunhua Hu, et al; "Train Queue Processing for Highly Scalable Switch Fabric Design", Global Telecommunications Conference, 2001, IEEE, vol. 4, pp. 2088-2092.

D.E. Simpson, et al; "Design of Multivoltage Locos for International Service", International Conference on Main Line Railway Electrification, Sep. 25-28, 1989, pp. 88-92.

M.A. Schlenker, (1995) "Improving Railroad Performance Using Advanced Service Design Techniques: Analyzing the Operating Plan at CSX Transportation", May 1995, pp. 83-110.

A. Rubaai; "A Neural-net-based device for monitoring Amtrak railroad track system", Industry Applications, IEEE Transactions on, vol. 39, Issue 2, Digital Object Identifier:10.1109/TIA.2003.809443; Publication Year: 2003, p. 2: 374-381.

A. Rubaai, et al; "Design of a neuron-classifier/detector for Amtrak rail-road track operations", Industry Applications Conference, 1998. Thirty-Third IAS Annual Meeting. The 1998 IEEE; vol. 3; Digital Object Identifier: 10.1109/IAS.1998.729801; Publication Year: 1998, pp. 1703-1708, vol. 3.

W.E.L. Grimson, et al; "Using adaptive tracking to classify and monitor activities in a site", Computer Vision and Pattern Recognition, 1998. Proceedings. 1998 IEEE Computer Society Conference on; Digital Object Identifier: 10.1109/CVPR.1998.698583; Publication Year: 1998, pp. 22-29.

E. Lin, et al; YardSim: A rail yard simulation framework and its implementation in a major railroad in the U.S.; Winter Simulation Conference (WSC).

Proceedings of the 2009; Digital Object Identifier: 10.1109/WSC.2009.5429654; Publication Year: 2009, pp. 2532-2541.

U. Yildirim et al; "Application of functional safety on railways part II: Software development", Control Conference (ASCC) 2011 $8^{th}$ Asian; Publication Year: 2011, pp. 1096-1101.

H.D. Harrison, et al; "Managing the gross weight on rail;", Rail Conference, 2006. Proceedings of the 2006 IEEE/ASME Joint; Digital Object Identifier: 10.1109/RRCON.2006.215307; Publication Year: 2006, pp. 169-179.

R.D. Burns, et al; "Safety and productivity improvement of railroad operations by advanced train control system", Railroad Conference, 1989. Proceedings., Technical Papers Presented at the 1989 IEEE/ASME Joint; Digital Object Identifier: 10.1109/RRCON.1989.77278; Publication Year: 1989, pp. 33-38.

USPTO OA mailed Oct. 16, 2007 in connection with U.S. Appl. No. 11/387,570.

USPTO NOA mailed Sep. 22, 2008 in connection with U.S. Appl. No. 11/387,570.

USPTO OA mailed May 1, 2008 in connection with U.S. Appl. No. 11/388,041.

USPTO OA mailed Aug. 12, 2009 in connection with U.S. Appl. No. 11/388,041.

USPTO OA mailed Jan. 12, 2010 in connection with U.S. Appl. No. 11/388,041.

USPTO NOA mailed Apr. 29, 2010 in connection with U.S. Appl. No. 11/388,041.

USPTO OA mailed Apr. 30, 2008 in connection with U.S. Appl. No. 11/388,062.

USPTO OA mailed Jan. 23, 2009 in connection with U.S. Appl. No. 11/388,062.

USPTO OA mailed Jun. 18, 2009 in connection with U.S. Appl. No. 11/388,062.

USPTO NOA mailed May 19, 2009 in connection with U.S. Appl. No. 11/388,062.

USPTO OA mailed Oct. 8, 2008 in connection with U.S. Appl. No. 11/388,129.

USPTO NOA mailed Mar. 23, 2009 in connection with U.S. Appl. No. 11/388,129.

USPTO OA mailed Apr. 4, 2008 in connection with U.S, Appl. No. 11/387,290.

USPTO OA mailed Nov. 18, 2008 inconnection with U.S. Appl. No. 11/387,290.
USPTO OA mailed Feb. 23, 2009 in connection with U.S. Appl. No. 11/387,290.
USPTO OA mailed Dec. 18, 2009 in connection with U.S. Appl. No. 11/387,290.
USPTO OA mailed Jun. 8, 2010 in connection with U.S. Appl. No. 11/387,290.
USPTO OA mailed Dec. 7, 2010 in connection with U.S. Appl. No. 11/387,290.
USPTO FOA mailed May 24, 2011 in connection with U.S. Appl. No. 11/387,290.
USPTO OA mailed May 9, 2008 in connection with U.S. Appl. No. 11/387,297.
USPTO OA mailed Mar. 10, 2009 in connection with U.S. Appl. No. 11/387,297.
USPTO OA mailed Sep. 16, 2009 in connection with U.S. Appl. No. 11/387,297.
USPTO NOA mailed Mar. 2, 2010 in connection with U.S. Appl. No. 11/387,297.
USPTO OA mailed Feb. 23, 2010 in connection with U.S. Appl. No. 11/601,338.
USPTO NOA mailed Jul. 11, 2011 in connection with U.S. Appl. No. 11/601,338.
USPTO OA mailed Jul. 22, 2009 in connection with U.S. Appl. No, 11/387,347.
USPTO OA mailed Mar. 23, 2010 in connection with U.S. Appl. No, 11/387,347.
USPTO OA mailed Apr. 7, 2010 in connection with U.S. Appl. No. 11/387,347.
USPTO OA mailed Sep. 14, 2009 in connection with U.S. Appl. No. 11/387,348.
USPTO NOA mailed Feb. 16, 2010 in connection with U.S. Appl. No. 11/387,348.
USPTO OA mailed Mar. 30, 2010 in connection with U.S. Appl. No. 11/387,364.
USPTO OA mailed May 1, 2008 in connection with U.S. Appl. No. 11/387,364.
USPTO OA mailed Mar. 10, 2009 in connection with U.S. Appl. No. 11/387,364.
USPTO OA mailed Oct. 9, 2009 in connection with U.S. Appl. No. 11/387,364.
USPTO NOA mailed May 27, 2010 in connection with U.S. Appl. No. 11/387,364.
USPTO OA mailed Oct. 16, 2007 in connection with U.S. Appl. 11/387,370.
USPTO OA mailed Feb. 2, 2009 in connection with U.S. Appl. No. 11/387,370.
USPTO OA mailed Apr. 15, 2009 in connection with U.S. Appl. No. 11/387,370.
USPTO OA mailed Jul. 15, 2009 in connection with U.S. Appl. No. 11/387,370.
USPTO NOA mailed Feb. 19, 2010 in connection with U.S. Appl. No. 11/387,370.
USPTO OA mailed May 2, 2008 in connection with U.S. Appl. No. 11/387,373.
USPTO OA mailed Mar. 12, 2009 in connection with U.S. Appl. No. 11/387,373.
USPTO OA mailed Sep. 16, 2009 in connection with U.S. Appl. No. 11/387,373.
USPTO NOA mailed Mar. 16, 2010 in connection with U.S. Appl. No. 11/387,373.
USPTO NOA mailed Mar. 21, 2011 in connection with U.S. Appl. No. 12/777,426.
USPTO OA mailed May 5, 2008 in connection with U.S. Appl. No. 11/387,474.
USPTO OA mailed Mar. 12, 2009 in connection with U.S. Appl. No. 11/387,474.
USPTO NOA mailed Oct. 1, 2009 in connection with U.S. Appl. No. 11/387,474.
USPTO OA mailed Sep. 24, 2008 in connection with U.S. Appl. No. 11/387,833.
USPTO OA mailed Mar. 18, 2010 in connection with U.S. Appl. No. 11/702,864.
USPTO OA mailed Feb. 2, 2011 in connection with U.S. Appl. No. 11/702,864.
USPTO NOA mailed Aug. 18, 2011 in connection with U.S. Appl. No. 11/702,864.
USPTO OA mailed Dec. 8, 2010 in connection with U.S. Appl. No. 12/637,965.

* cited by examiner

Outbound Line Up

| Train | sTD | eTD | | Status | Dept Trk#1 | OB Inspection Start | OB Inspection End | Rips | Traffic Offered Cars | Traffic Offered Feet | Traffic Offered Tons | Forecast Cars | Forecast Feet | Forecast Tons |
|---|---|---|---|---|---|---|---|---|---|---|---|---|---|---|
| M30131-15 | 12:00 | 12:00 | A | Departing | W001 | 10:00-15 | 10:00-15 | | 90 | 5,850 | 9,450 | 90 | 5,850 | 9,450 |
| M39331-15 | 13:00 | 13:49 | A | Inspection | W002* | 11:30-15 | 12:45-15 | 2 | | | | | | |
| M39731-15 | 14:00 | 14:15 | E | Set | | 12:46-15 | 13:45-15 | | | | | | | |
| M39931-15 | 15:00 | 15:45 | E | Pull Down | | 13:45-15 | 14:05-15 | | | | | | | |
| E20131-15 | 16:00 | 17:00 | L | Planned | W004 | 15:05-15 | | | | | | | | |
| A45131-15 | 17:00 | 17:30 | E | Planned | | | | | | | | | | |
| E27131-15 | 18:00 | 18:00 | E | Planned | | | | | | | | | | |
| M30331-15 | 23:00 | 23:00 | E | Planned | | 21:00-15 | 22:30-15 | | 103 | 6,753 | 11,129 | 95 | 6,225 | 10,225 |

| Last Car | Crew Time | Cmt |
|---|---|---|
| 19:15-15 | | |

FIG. 9

Train M3XXXX-XX

| Trn Block | Incl. | Cut-Off | Limits (ft) | Traffic Offered ||| Processed ||| Consist Forcast |||
|---|---|---|---|---|---|---|---|---|---|---|---|---|
| | | | | Cars | Feet | Tons | Cars | Feet | Tons | Cars | Feet | Tons |
| BLOCK1 | Y | 16:00 | | 17 | 1272 | 3816 | 7 | 522 | 1566 | 15 | 1113 | 3339 |
| BLOCK2 | Y | 16:00 | | 13 | 931 | 2793 | 5 | 345 | 1068 | 12 | 841 | 2523 |
| Core | | | | 30 | 2203 | 6609 | 12 | 867 | 2634 | 27 | 1954 | 5862 |

| Trn Block | Incl. | Cut-Off | Limits (ft) | Cars | Feet | Tons | Cars | Feet | Tons | Cars | Feet | Tons |
|---|---|---|---|---|---|---|---|---|---|---|---|---|
| BLOCK3 | N | | | 15 | 1094 | 3282 | 3 | 190 | 478 | 0 | 0 | 0 |
| Fill | | | | 15 | 1094 | 3282 | 3 | 190 | 478 | 0 | 0 | 0 |

| Total | | | | 30 | 2203 | 6609 | 12 | 867 | 2634 | 27 | 1954 | 5562 |
|---|---|---|---|---|---|---|---|---|---|---|---|---|
| | | | Manual Forecast-> | | | | | | | 27 | 1954 | 5562 |

Spec Limit   2000 ft

FIG. 10

Train M3XXXX-XX

| | | | | | Traffic Offered | | | Processed | | | Consist Forcast | | |
|---|---|---|---|---|---|---|---|---|---|---|---|---|---|
| Trn Block | Incl. | Cut-Off | Limits (ft) | | Cars | Feet | Tons | Cars | Feet | Tons | Cars | Feet | Tons |
| BLOCK1 | Y | | | | 17 | 1272 | 3816 | 7 | 522 | 1566 | 15 | 1113 | 3339 |
| | | Track/Train | Proc.Time | To Trk | Cars | Feet | Tons | Cars | Feet | Tons | Cars | Feet | Tons |
| | | C005 | Now | | 2 | 144 | 432 | 7 | 522 | 1566 | 2 | 144 | 432 |
| | | R014 | 11:30 | C005 | 6 | 470 | 1410 | 0 | 0 | 0 | 6 | 470 | 1410 |
| | | M30YYY-YY | 14:05 | C005 | 9 | 658 | 1974 | 0 | 0 | 0 | 7 | 522 | 1566 |
| BLOCK2 | Y | | 16:00 | | 30 | 2203 | 6609 | 12 | 867 | 2634 | 27 | 1954 | 5862 |
| | | | | | 30 | 2203 | 6609 | 12 | 867 | 2634 | 27 | 1954 | 5862 |

| Trn Block | Incl. | Cut-Off | Limits (ft) | | Cars | Feet | Tons | Cars | Feet | Tons | Cars | Feet | Tons |
|---|---|---|---|---|---|---|---|---|---|---|---|---|---|
| BLOCK3 | N | | | | 15 | 1094 | 3282 | 3 | 190 | 478 | 0 | 0 | 0 |
| | | | | | 15 | 1094 | 3282 | 3 | 190 | 478 | 0 | 0 | 0 |

| Total | | | | | 30 | 2203 | 6609 | 12 | 867 | 2634 | 27 | 1954 | 5562 |
|---|---|---|---|---|---|---|---|---|---|---|---|---|---|
| | | | | | | | | Manual Forecast-> | | | 27 | 1954 | 5562 |

Spec Limit  2000 ft

FIG. 11

Train M3XXXX-XX

| Trn Block | Incl. | Cut-Off | Limits (ft) | | Traffic Offered | | | Processed | | | Consist Forcast | | |
|---|---|---|---|---|---|---|---|---|---|---|---|---|---|
| BLOCK1 | Y | 16:00 | | Cars | Feet | Tons | Cars | Feet | Tons | Cars | Feet | Tons |
| Track/Train | | Proc.Time | To Trk | 17 | 1272 | 3816 | 7 | 522 | 1566 | 15 | 1113 | 3339 |
| | | | | Cars | Feet | Tons | Cars | Feet | Tons | Cars | Feet | Tons |
| C005 | | Now | C005 | 2 | 144 | 432 | 7 | 522 | 1566 | 2 | 144 | 432 |
| R014 | | 11:30 | C005 | 6 | 465 | 1395 | 0 | 0 | 0 | 6 | 470 | 1410 |
| M30YYY-YY | | 14:05 | | 9 | 663 | 1989 | 0 | 0 | 0 | 7 | 522 | 1566 |
| Location | | | | Cars | Feet | Tons | Cars | Feet | Tons | Cars | Feet | Tons |
| on train | | | | 3 | 213 | 633 | 0 | 0 | 0 | 3 | 205 | 615 |
| BELLEVILL-MTF | | | | 2 | 128 | 384 | 0 | 0 | 0 | 2 | 120 | 360 |
| OSHAWA | | | | 2 | 163 | 489 | 0 | 0 | 0 | 2 | 180 | 540 |
| A453 | | | | 1 | 86 | 258 | 0 | 0 | 0 | 0 | 0 | 0 |
| CPRS-WTORONTO | | | | 1 | 73 | 219 | 0 | 0 | 0 | 0 | 0 | 0 |
| | | | | 13 | 931 | 2739 | 5 | 345 | 1068 | 12 | 841 | 2523 |
| BLOCK2 | Y | 16:00 | | 30 | 2203 | 6609 | 12 | 867 | 2634 | 27 | 1954 | 5862 |
| | | | | Cars | Feet | Tons | Cars | Feet | Tons | Cars | Feet | Tons |
| | | | | 15 | 1094 | 3282 | 3 | 190 | 478 | 0 | 0 | 0 |
| Trn Block | Incl. | Cut-Off | Limits (ft) | 15 | 1094 | 3282 | 3 | 190 | 478 | 0 | 0 | 0 |
| BLOCK3 | N | | | | | | | | | | | |
| Total | | | | 30 | 2203 | 6609 | 12 | 867 | 2634 | 27 | 1954 | 5562 |
| | | | | | | Manual Forecast-> | | | | 27 | 1954 | 5562 |

Spec Limit  2000 ft

FIG. 12

Train M3XXXX-XX

| Trn Block | Incl. | Cut-Off | Limits (ft) | | Traffic Offered | | | | Processed | | | |
|---|---|---|---|---|---|---|---|---|---|---|---|---|
| BLOCK1 | Y | 16:00 | | | Cars | Feet | Tons | | Cars | Feet | Tons | Cars |
| Track/Train | | Proc.Time | To Trk | | 17 | 1272 | 3816 | | 7 | 522 | 1566 | 15 |
| C005 | | Now | C005 | | Cars | Feet | Tons | | Cars | Feet | Tons | Cars |
| R014 | | 11:30 | C005 | | 2 | 144 | 432 | | 7 | 522 | 1566 | 2 |
| M30YYY-YY | | 14:05 | | | 6 | 465 | 1395 | | 0 | 0 | 0 | 6 |
| | | | | | 9 | 663 | 1989 | | 0 | 0 | 0 | 7 |
| Location | | | | | Cars | Feet | Tons | | Cars | Feet | Tons | Cars |
| on train | | | | | 3 | 213 | 633 | | 0 | 0 | 0 | 3 |
| BLOCK2 | Y | 16:00 | | | | | | | | | | |
| BELLEVILL-MTF | | | | | 2 | 128 | 384 | | 0 | 0 | 0 | 2 |
| OSHAWA | | | | | 2 | 163 | 489 | | 0 | 0 | 0 | 2 |
| A453 | | | | | 1 | 86 | 258 | | 0 | 0 | 0 | 0 |
| CPRS-WTORONTO | | | | | 1 | 73 | 219 | | 0 | 0 | 0 | 0 |
| | | | | | 13 | 931 | 2739 | | 5 | 345 | 1068 | 12 |
| | | | | | 30 | 2203 | 6609 | | 12 | 867 | 2634 | 27 |
| BLOCK3 | N | | | | Cars | Feet | Tons | | Cars | Feet | Tons | Cars |
| | | | | | 15 | 1094 | 3282 | | 3 | 190 | 478 | 0 |
| | | | | | 15 | 1094 | 3282 | | 3 | 190 | 478 | 0 |
| Total | | | | | 30 | 2203 | 6609 | | 12 | 867 | 2634 | 27 |
| | | | | | | | Manual Forecast-> | | | | | 27 |
| | | | | | | | Spec Limit | | | | | |

(Core / Fill shown on left margin; BLOCK1 containing M30YYY-YY)

| Consist Forcast | | On Train | Car Init | Car Numb | L/E | Feet | Tons | Kind | Contents | Sel. |
|---|---|---|---|---|---|---|---|---|---|---|
| Feet | Tons | | | | | | | | | |
| 1113 | 3339 | | | | | | | | | |
| Feet | Tons | | | | | | | | | |
| 144 | 432 | | CN | 987943 | L | 92 | 92 | 92 | LUMBER | 1 |
| 470 | 1410 | | IC | 54264 | L | 65 | 65 | 65 | ETHYL | 1 |
| 522 | 1566 | | CN | 5234 | L | 56 | 56 | 56 | LUMBER | 1 |
| Feet | Tons | | | | | | | | | |
| 205 | 615 | | | | | | | | | |
| 120 | 360 | | | | | | | | | |
| 180 | 540 | | | | | | | | | |
| 0 | 0 | | | | | | | | | |
| 0 | 0 | | | | | | | | | |
| 841 | 2523 | | | | | | | | | |
| 1954 | 5862 | | | | | | | | | |
| Feet | Tons | | | | | | | | | |
| 0 | 0 | | | | | | | | | |
| 0 | 0 | | | | | | | | | |
| 1954 | 5562 | | | | | | | | | |
| 1954 | 5562 | | | | | | | | | |

2000 ft

Train M3XXXX-XX

Core

| Trn Block | Incl. | Cut-Off | Limits (ft) | Traffic Offered ||| Processed ||| Consist Forcast |||
|---|---|---|---|---|---|---|---|---|---|---|---|---|
| | | | | Cars | Feet | Tons | Cars | Feet | Tons | Cars | Feet | Tons |
| BLOCK1 | Y | 16:00 | | 17 | 1272 | 3816 | 7 | 522 | 1566 | 15 | 1113 | 3339 |
| BLOCK2 | Y | 16:00 | | 13 | 931 | 2793 | 5 | 345 | 1068 | 12 | 841 | 2523 |
| | | | | 30 | 2203 | 6609 | 12 | 867 | 2634 | 27 | 1954 | 5862 |

Fill

| Trn Block | Incl. | Cut-Off | Limits (ft) | Cars | Feet | Tons | Cars | Feet | Tons | Cars | Feet | Tons |
|---|---|---|---|---|---|---|---|---|---|---|---|---|
| BLOCK3 | N | | | 15 | 1094 | 3282 | 3 | 190 | 478 | 0 | 0 | 0 |
| | | | | 15 | 1094 | 3282 | 3 | 190 | 478 | 0 | 0 | 0 |

Total

| | | | | 30 | 2203 | 6609 | 12 | 867 | 2634 | 27 | 1954 | 5562 |
|---|---|---|---|---|---|---|---|---|---|---|---|---|
| | | | | | | | Manual Forecast-> | | | 27 | 1954 | 5562 |

Spec Limit  2000 ft

FIG. 14

Train M3XXXX-XX

| Core | Trn Block | Incl. | Cut-Off | Limits (ft) |
|---|---|---|---|---|
| | BLOCK1 | Y | 16:00 | |
| | BLOCK2 | Y | 16:00 | |

| Fill | Trn Block | Incl. | Cut-Off | Limits (ft) |
|---|---|---|---|---|
| | BLOCK3 | N | | 670 |

| BLOCK3 | Track/Train | Proc.Time | To Trk | Limits Calc. | | |
|---|---|---|---|---|---|---|
| | | | | Feet | Sel. | |
| | C005 | Now | | 670 | 1 | |
| | R014 | 11:30 | C014 | 0 | 0 | |
| | M30YYY-YY | 14:05 | C014 | 0 | 0 | |

| | Traffic Offered | | | Processed | | | Consist Forcast | | |
|---|---|---|---|---|---|---|---|---|---|
| | Cars | Feet | Tons | Cars | Feet | Tons | Cars | Feet | Tons |
| | 17 | 1272 | 3816 | 7 | 522 | 1566 | 15 | 1113 | 3339 |
| | 13 | 931 | 2793 | 5 | 345 | 1068 | 12 | 841 | 2523 |
| | 30 | 2203 | 6609 | 12 | 867 | 2634 | 27 | 1954 | 5862 |
| | 15 | 1094 | 3282 | 3 | 190 | 478 | 0 | 0 | 0 |
| | Cars | Feet | Tons | Cars | Feet | Tons | Cars | Feet | Tons |
| | 10 | 670 | 2010 | 10 | 670 | 1040 | 0 | 0 | 0 |
| | 2 | 134 | 402 | 0 | 0 | 0 | 0 | 0 | 0 |
| | 3 | 290 | 870 | 0 | 0 | 0 | 0 | 0 | 0 |
| | 15 | 1094 | 3282 | 3 | 190 | 478 | 0 | 0 | 0 |
| Total | 30 | 2203 | 6609 | 12 | 867 | 2634 | 27 | 1954 | 5562 |
| | | | | Manual Forecast-> | | | 27 | 1954 | 5562 |

Spec Limit  2000 ft

FIG. 15

SYSTEM AND METHOD FOR FORECASTING THE COMPOSITION OF AN OUTBOUND TRAIN IN A SWITCHYARD

CROSS-REFERENCE TO RELATED APPLICATION

The present application is a continuation-in-part of prior U.S. application Ser. No. 11/601,338 filed on Nov. 17, 2006. The contents of the aforementioned document are incorporated by reference herein.

FIELD OF THE INVENTION

The invention relates to a process for managing operations in a railroad switchyard. The invention also encompasses a technological platform and individual components thereof to implement the process.

BACKGROUND OF THE INVENTION

A railroad network normally contains one or more switchyards in which railcars are routed from tracks leading from a departure point to tracks going to a destination point. A typical switchyard has four main components, namely receiving tracks, a railcar switching mechanism, a set of classification tracks and a set of departure tracks. Incoming trains deliver railcars in the receiving tracks. The railcars are processed by the switching mechanism that routes individual railcars to respective classification tracks.

Two types of switching mechanisms are in use today. The first one is a hump switch. Switchyards that use a hump switch are referred to as hump yards. A hump switchyard uses a hump over which a railcar is pushed by a locomotive. At the top of the hump the railcar is allowed to roll on the other side of the hump under the effect of gravity. Retarders keep the railcar from reaching excessive speeds. The hump tracks on which the railcar rolls down the hump connect with the classification tracks. A track switch establishes a temporary connection between the hump tracks and a selected one of the classification tracks such that the railcar can roll in the classification tracks. A departure train is constituted when the requisite number of railcars has been placed in a set of classification tracks. When the departure train leaves the switchyard, the set of classification tracks become available for building a new departure train.

The second type of switch mechanism is a flat switch. The principle is generally the same as a hump yard except that instead of using gravity to direct railcars to selected classification tracks, a locomotive is used to push the railcar from the receiving tracks to the selected set of classification tracks.

In order to increase the efficiency of switching operations railway companies have developed the concept of railcar blocking. Under this concept, a block of railcars, hence the name "blocking", may be logically switched as a unit in a switchyard. A block is established on a basis of certain properties shared by the railcars belonging to the block. For instance railcars that have a common destination point on their route can be blocked together. A "block" is therefore a logical entity that helps making switching decisions. For reference it should be noted that generally, two types of blocks exist. There is the so called "yard block" and a "train block". For clarity, the term "block" alone in the present specification encompasses either a yard block or a train block.

The principle of blocking, either yard blocking or train blocking increases the efficiency with which railcars are processed at switchyards. However, it also brings constraints. Very often a train block must be assembled from railcars that arrive on different incoming trains. The train block will be complete and available for departure only when all the railcars that make up the train block have arrived at the switchyard. If one or more of the railcars are delayed the train block cannot be completed and the entire departure train that pulls this train block may leave without the delayed railcars. Such occurrence may create a cascading effect throughout entire segments of the railroad network and have significant financial repercussions for the railroad operator. Specifically, it is not uncommon for an operator to guarantee railcar arrival times to customers and delays incur financial penalties that may be significant.

In general switchyard operations planning is done either manually or via simple management tools. In order to increase the efficiency of those operations there is a need to provide an automated system that can forecast the outbound workload and thus provide the yard master with a projection of the traffic that can be available to departure trains.

SUMMARY OF THE INVENTION

As embodied and broadly described herein, the invention includes a system for forecasting the outbound workload in a switchyard. The system has a processing entity for which receives information on railcar traffic for handling by the switchyard, wherein the railcar traffic includes railcars that are yet to be switched into classification tracks of the switchyard. For every departure train of two or more departure trains, the processing entity applies logic rules to the information to compute a forecast of railcar traffic that will be available to the departure train for transport out of the switchyard. An output releases data derived from the forecast of railcar traffic, describing the traffic available for each train of the two or more departure trains.

As embodied and broadly described herein, the invention also provides a method for forecasting the outbound workload in a switchyard. The method comprises the step of receiving information on railcar traffic for handling by the switchyard, wherein the railcar traffic includes railcars that are yet to be switched into classification tracks of the switchyard. The method also includes the steps of, for each of two or more departure trains, applying logic rules to the information to compute a forecast of railcar traffic that will be available to the departure train for transport out of the switchyard, and releasing data derived from the forecast of railcar traffic, for describing to a user the traffic available for each train of the two or more departure trains.

As embodied and broadly described herein, the invention further includes a system for forecasting the outbound workload in a switchyard. The system comprises a processing entity for:
i) assigning railcars that have not yet been switched into classification tracks of the switchyard to respective departure trains; and
ii) computing a forecast of railcar traffic that will be available to individual ones of the departure trains for transport out of the switchyard at least in part on the basis of said assigning;
b) an output for releasing data derived from the forecast of railcar traffic, describing the traffic available for at least one of the departure trains.

As embodied and broadly described herein, the invention further includes a method for forecasting the outbound workload in a switchyard. The method includes:

a) assigning railcars that have not yet been switched into classification tracks of the switchyard to respective departure trains;
b) computing with a computer a forecast of railcar traffic that will be available to individual ones of the departure trains for transport out of the switchyard at least in part on the basis of the assigning;
c) releasing data from the computer derived from the forecast of railcar traffic, describing the traffic available for at least one of the departure trains.

As embodied and broadly described herein, the invention further includes a system for forecasting the outbound workload in a switchyard. The system includes:
a) a processing entity for:
 i) matching railcars yet to be switched in the switchyard to departure trains, said matching including forecasting for a railcar the departure train that will be available to transport the railcar out of the switchyard when the processing of the railcar by the switchyard will be completed;
 ii) computing a forecast of railcar traffic that will be available to individual ones of the departure trains for transport out of the switchyard at least in part on the basis of said matching;
b) an output for releasing data derived from the forecast of railcar traffic, describing the traffic available for at least one of the departure trains.

BRIEF DESCRIPTION OF THE DRAWINGS

A detailed description of examples of implementation of the present invention is provided hereinbelow with reference to the following drawings, in which:

FIG. 9 is an excerpt of GUI illustrating the workflow forecasting information at the train level;

FIG. 10 is an excerpt of a GUI illustrating the workflow forecasting information at the block level;

FIG. 11 is an excerpt of a GUI illustrating the workflow forecasting information at the track level;

FIG. 12 is an excerpt of a GUI illustrating the workflow forecasting information at the location level;

FIG. 13 is an excerpt of a GUI illustrating the workflow forecasting information at the railcar level;

FIG. 14 is an excerpt of a GUI illustrating the workflow forecasting information at the block level with editable fields highlighted allowing to manually adjust blocks settings;

FIG. 15 is an excerpt of a GUI illustrating a limit calculator screen; and

Figure 1:
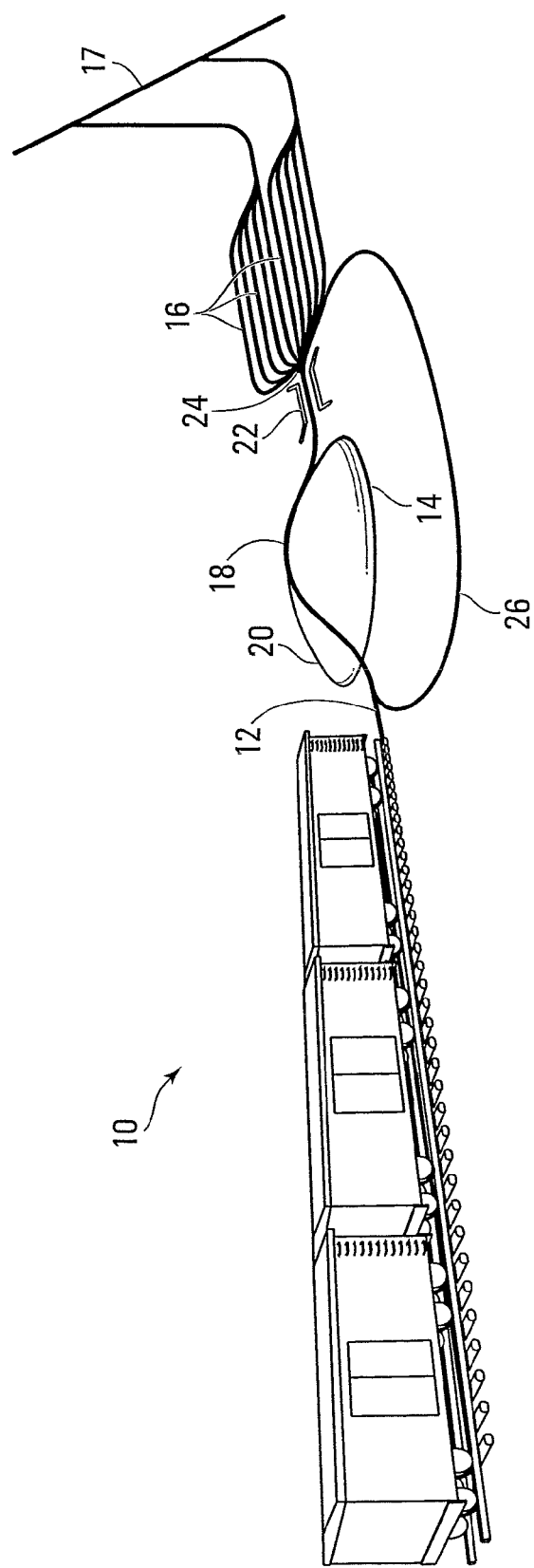
FIG. 1 is a schematical illustration of a hump switchyard.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 is an illustration of a hump switching yard in which the management process of the invention can be implemented. The hump switching yard 10 has four main components namely receiving tracks 12, a hump 14, classification tracks 16 and departure tracks 17. The receiving tracks 12 include railway sections in which an incoming train delivers railcars to be switched.

The receiving tracks 12 lead to the hump 14. The hump 14 includes a set of tracks 20 that lead to the hump crest 18 that is the highest elevation of the hump 14. railcars are pushed by a locomotive on the tracks 20 up to the hump crest 18 at which point the railcar rolls down the hump 14 by gravity toward the set of classification tracks 16. The railcar passes through retarders 22 that will reduce its speed allowing it to gently coast in anyone of the selected classification tracks 16. A track switch 24, located downstream the retarders 22 temporarily connects the hump track 12 to a selected one of the classification tracks 16 such as to direct the railcar to the desired classification track 16.

The receiving tracks 12, therefore, form a switching queue in which railcars that are delivered to the switching yard 10, await to be switched.

The classification tracks 16 lead to the departure tracks 17. Specifically, the classification tracks are arranged into groups, where each group leads to a departure track 17. The hump switchyard 10 shown in the drawings includes 10 classification tracks organized into two groups of five tracks. Each group of five tracks connects to the departure track 17.

Generally, the classification tracks 16 are used to assemble train blocks. Train blocks are pulled out of the classification tracks into the departure tracks 17 where the actual departure train is built. The departure tracks 17 allow assembling trains having more railcars than a single classification track can hold. When a complete train (short train) is assembled into a single classification track 16, the departure train leaves that track directly by passing through the departure track 17.

It should be appreciated that FIG. 1 is a very simplified illustration of a hump switchyard in that the number of tracks shown has been significantly reduced for clarity purposes. An average size hump yard typically contains many more classification tracks than what is shown in FIG. 1. For example it would not be uncommon for a switchyard to have 80 or more classification tracks organized into physical groups of tracks, where each group connects to a departure track. In addition, there will normally be a larger number of departure tracks 17 than what appears on the drawing.

The hump switchyard 10 also includes a reswitching track that allows to "recirculate" railcars from a position downstream of the switch 24 to a position upstream of the switch 24. In a typical hump switchyard, such as the yard 10 the reswitching track is called "rehump track". The rehump track is shown at 26 in FIG. 1. The rehump track 26 originates downstream the track switch 24 leads to the hump tracks 20 at the base of the hump 14. The purpose of the rehump tracks 26 is to provide a buffering mechanism where one or more railcars can be temporarily put in storage without blocking the flow of other railcars through the hump switchyard 10. For instance, situations may arise where one or more railcars in the receiving tracks 12 cannot be switched in any one of the classification tracks 16. This may be due, for example to the lack of space availability in the classification tracks 16. It is common practice for a hump switchyard 10 to periodically hump the railcars in the rehump tracks 26. Such rehumping involves pushing the railcars over the hump 14 such that they can be switched to a selected classification track 16. If a railcar cannot be routed to any one of the classification tracks 16 it is put back in the rehump tracks 26 for a new humping cycle.

The following description of a non-limiting example of implementation of a switchyard management process will be done in connection with a hump switchyard 10 of the type described earlier. However, it should be expressly noted that the principles of the invention apply equally well to a flat switchyard. Accordingly, the invention should not be limited to a hump switchyard but encompasses a flat switchyard as well. A flat switchyard operates generally in the same way as described earlier in that incoming trains deliver railcars at the input side of the flat switchyard, a switching device routes the individual railcars to classification tracks to assemble departure trains in departure tracks.

Figure 2:
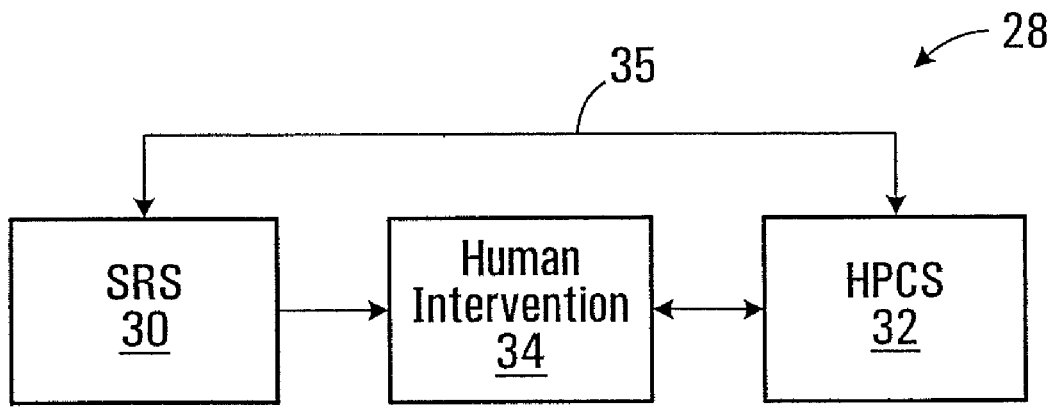
FIG. 2 is a high level block diagram of a prior art computer based switchyard management system.

FIG. 2 illustrates a block diagram of a prior art control system 28 for use in managing the operations of a hump switchyard 10. Specifically, the control system 28 includes two main components, namely the Service Reliability System (SRS) component 30 and the Hump Process Control System (HPCS) 32. The SRS component 30 is in essence a railway traffic management system that keeps track of the rolling stock inventory throughout the rail network. It is used to manage the flow of railway traffic over a complete railway network or a portion thereof. The SRS component 30 is a computer based system that reflects the railway operations by showing information on trains, schedules, waybills, trip plans and train delays. The SRS component 30 has a number of sub-systems that are integrated to one another. Some of the sub-components are briefly described below:

Waybill—a computer file that provides details and instructions on the movement of railcars. railcars and units cannot move without a waybill;

Service Scheduling—the service scheduling sub-component is based on a trip plan that specifies the events a shipment must follow from origin to destination. A trip plan identifies the train connections for each railcar and provides a destination Estimated Time of Arrival (ETA). The service scheduling sub-component continuously monitors the movement of each shipment and compares its progress to the trip plan. If the service scheduling determines that a shipment will not meet the established requirements, it triggers alarms;

Yard Operating Plan/Daily Operating Plan (YOP/DOP)—the YOP sub-component defines how assets (crews, railcars, locomotives and tracks) are allocated to support yard related activities. The DOP is derived from the YOP and contains instructions for industrial assignments;

Yard, Industry and Train (YIT)—the YIT sub-component allows users to report train and railcar movements such as train arrivals and departures, yard switches, exchange of railcars with other railroads, and the placing and pulling of railcars at a customer siding.

Intermodal—this sub-component includes functions for gating-in, gating-out, assigning, ramping, deramping as well as maintaining inventories of Intermodal equipment.

The SRS component 30 includes a processing function that is illustrated as a single block, but it can be implemented also in a distributed fashion.

It should be expressly noted that the SRS component 30 is merely an example of a railway traffic management system and other railway traffic management systems can be used without departing from the spirit of the invention.

The HPCS component 32 operates the track switch in the hump switchyard 10. Essentially, the HPCS component 32 is a railcar switch control system that determines on the basis of inputs the position of the track switch 24 such that a railcar or a series of railcars over the hump, will be directed to the desired classification track 16. Broadly stated, the HPCS component 32 has two main goals, namely:

Deliver the railcars to the correct classification track 16;

Insure that the railcars will arrive in the classification track 16 fast enough to reach the railcars already in the track but slow enough for a safe coupling (or reach the far end of the track if it is empty);

As in the case with the SRS component 30, the HPCS component 32 is illustrated as a single block but it can be implemented in a distributed fashion.

It should be expressly noted that the HPCS component is merely an example of a railcar switch control system and other railcar switch control systems can be used without departing from the spirit of the invention.

As shown by FIG. 2 a human intervention 34 is required to interface the SRS component 30 and the HPCS component 32. Specifically, the SRS component identifies the trains that are scheduled to arrive at the hump switchyard 10 and the trains that are scheduled to depart the hump switchyard 10. On the basis of this information a hump list is manually produced. The hump list determines in which classification track the various railcars will go. The hump list is then loaded into the HPCS component 32. The HPCS component 32 performs the switching as the railcars are humped, according to the specific switching instructions in the hump list. As indicated previously, the prior art technique consists of humping the railcars according to a FIFO sequence; the railcars that arrive first at the switchyard are likely to be humped first, unless the yard operator decides otherwise. In short the humping operation is largely driven by human judgment and its efficiency is therefore dependent on the experience and knowledge of the operator. In addition, the number of factors that the operator needs to take into account in order to make a decision on the order in which the railcars are to be humped is quite large which makes it very difficult to mentally figure what the optimal solution is.

Note the communication link 35 between the HPCS component 32 and the SRS component 30. This link 35 illustrates the exchange of data between the two components, for instance the HPCS component 32 notifying the SRS component 30 of events or conditions occurring in the hump switchyard 10.

Figure 3:
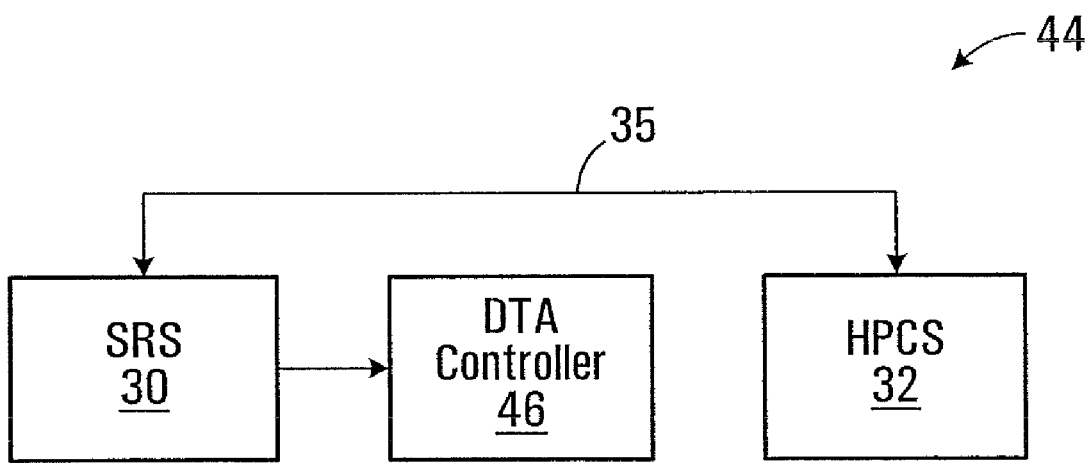
FIG. 3 is a high level block diagram of a computer based switchyard management system according to a non-limiting example of implementation of the invention.

FIG. 3 is a block diagram of control system 44 for use in managing the operations of the hump switchyard 10, according to a non-limiting example of implementation of the invention. The control system 44 includes three main components two of which are shared with the prior art control system 28 described earlier. Specifically, the control system 44 includes the SRS component 30, the HPCS component 32 and an operations management (OM) controller 46. The controller 46 is responsible for operations in the pre-switching category, such as to identify a preferred railcar switching sequence. It is also possible to design the OM controller 46 to manage tasks in the post-switching category, without departing from the spirit of the invention. One specific example of a post switching category task that the OM controller 46 can handle, is the allocation of switched railcars to classification tracks 16.

Figure 4:
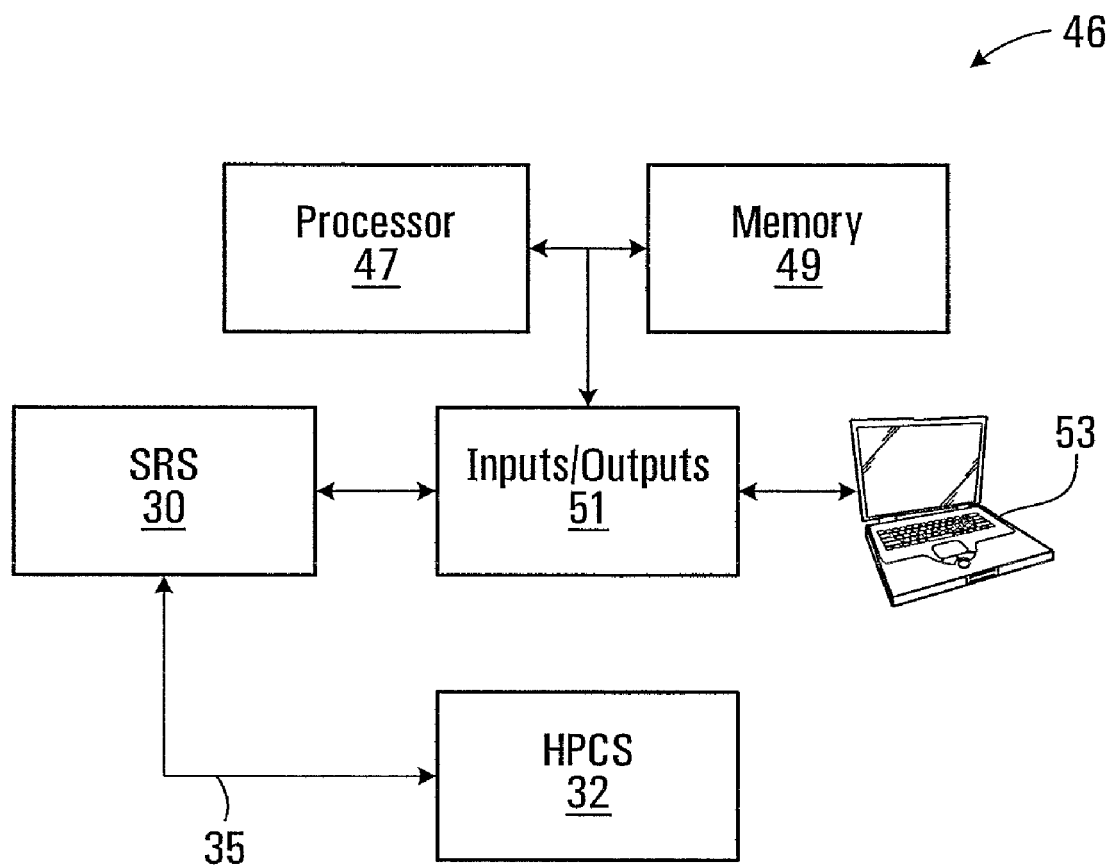
FIG. 4 is a more detailed block diagram of the system shown in FIG. 3.

FIG. 4 is a block diagram of the OM controller 46, showing the relationships with the SRS component 30 and the HPCS component 32. The OM controller 46 has a computing platform including a processor 47 that communicates with a machine readable storage unit 49, commonly referred to as "memory" over a data bus. Inputs and outputs (I/O interface) 51 allow the OM controller 46 to receive and send data to the SRS component 30 and the HPCS controller 32, via the SRS component 30. In addition, the I/O 51 communicates with a user interface that allows the OM controller 46 to communicate information to the user and receives commands or other inputs from the user. In essence, the user interface 53 shows the user recommended hump sequences and switching (assuming that the OM controller 46 is provided with functionality to handle the allocation of railcars to classification tracks 16) solutions that the OM controller 46 is developing. Those switching solutions can be implemented either automatically, i.e. pending an input from the user that stops the process, the proposed switching solutions are executed, or they may require explicit confirmation from the user. For instance, unless the user inputs at the user interface 53 a command to explicitly implement or authorize the switching solution presented by the OM controller 46 on the user interface 53, no action is taken by the system.

Note that while the diagram at FIG. 4 depicts the OM controller 46 as a single unit, it can also have a distributed architecture without departing from the spirit of the invention.

The functionality of the OM controller 46 is software defined. In other words, the logic that computes preferred humping sequences and also that determines how railcars are to be switched is implemented by executing software by the processor 47. The software in the form of program code is stored in the memory 49. The software reads data inputs received from the SRS component 30, and from the user interface 53. On the basis of those inputs, the OM controller 46 generates outputs to the user interface 53. The output to the user interface 53 is intended to display information to inform the user on the recommended hump sequences and switching solutions the OM controller 46 has reached. Optionally, an output may also be directed to the HPCS component 32, which contains switching commands that determine the positions of the track switch 24 and effectively implement the switching solutions developed by the OM controller 46.

In the example illustrated in FIG. 4, the OM controller 46 logically resides between the SRS component 30 and the HPCS component 32. As such the OM controller 46 receives information from the SRS component 30 about:
  Incoming trains (trains to be received in the hump switchyard 10), in particular:
    Identification of the train (Train ID)
    The Expected Time of Arrival (ETA);
    Point of origin;
    Destination;
    Identification of the train blocks that make up the train.
  Departure trains (trains the switchyard 10 is expected to assemble);
    Identification of the train (Train ID;
    The Expected Time of Departure (ETD);
    Identification of the train blocks that make up the train.

In order to make hump sequence recommendations and classification track assignments to individual railcars, the OM controller 46 creates representations in the memory 49 of the rolling stock that transits through the hump switchyard 10 by using hierarchal objects. Generally, three types of objects exist:
  A train object. A train object is associated with each train (arrival train or departure train) and it has properties such as:
    A train identifier (train ID);
    Expected time of arrival (ETA);
    Origin;
    Destination;
    Route; and
    Identification of train blocks that make up the train.
  A train block object. A train block object is associated with a block of railcars and has the following properties:
    A train block identifier (train block ID);
    Number of railcars making up the train block;
    Identity of the railcars making up the train block;
    Destination of the train block; and
    Route of the train block from the origin to the destination.
  A yard block object. A yard block object is associated with a block of railcars and has the following properties:
    A yard block identifier (yard block ID);
    Number of railcars making up the yard block;
    Identity of the railcars making up the yard block;
    Origin of the yard block;
    Destination of the yard block; and
    Route of the yard block from the origin to the destination.
  Car objects. A railcar object is associated with a single railcar and has the following properties:
    Car identifier (car ID);
    Car owner;
    If railcar railcarries railcargo the type of railcargo;
    If railcar is empty the customer identifier that has requested the railcar to be moved;
    Origin;
    Destination; and
    Route between origin and destination.

Normally, train objects that represent incoming trains will cease to exist when the train arrives at the hump switchyard 10 since the train is dismantled. An exception to this is a situation where the incoming train transits through the hump switchyard 10 in which case it remains intact. Departure trains are represented by train objects that begin their existence at the hump switchyard 10, having been assembled from railcars that originate from one or more dismantled incoming trains. Incoming train block objects may cease to exist if the train block is disassembled and the individual railcars are used to make up other train block objects. For example a train block arriving at the hump switchyard 10 may contain railcars having different destinations. For the sake of this example, say that half of the railcars need to be delivered to city A while the other half to city B. In such case the train block is disassembled and the railcars that go to city A are switched to form, alone or in combination with other railcars from a different train, a new train block that will travel to city A. The railcars directed to city B are switched in a similar manner. In this situation, two new train blocks are created at the hump switchyard 10, from one or more incoming train blocks. Another possibility is for train blocks to be modified, instead of ceasing to exist or beginning to exist. A train block can be modified by augmenting the train block, such as by adding to it one or more railcars or diminished by removing from it one or more railcars. Finally, a train block may remain unchanged such as when it simply transits through the hump switchyard 10. In such case, the train block is physically dismantled into individual railcars but the switching operation is conducted such as to reassemble the original train block. Alternatively, the train block can be routed directly to the departure tracks 17 such as to circumvent the switch 24.

As far as individual railcar objects, they remain unchanged as they transit through the hump switchyard 10.

The OM controller 46 receives from the SRS component 30 data that describes the incoming trains so that the OM controller 46 can determine the details of the rolling stock to be processed. The OM controller 46 also receives information on the departure trains that the hump switchyard 10 is expected to assemble.

In a specific example of implementation, the OM controller 46 receives form the SRS component 30 the following information:

The trains scheduled to arrive to the hump switchyard 10. The SRS component 30 simply provides the identity of the train (the train ID);

The trains that the SRS system expects the hump switchyard to make. The SRS component simply provides the identity of the train (train ID).

Once the OM controller 46 is made aware of incoming trains and the requirement to build departure trains, the train ID information allows the OM controller 46 to determine all the necessary information down to the individual railcar. More particularly, the train ID allows determining the properties of the train object and the properties of the train block objects derived via the train object and the properties of the railcar objects derived via the train block objects. This data will then allow the OM controller 46 to compute switching solutions.

It should be expressly noted that the above description of the manner in which information is provided to the OM controller 46 is strictly an example and should not be constructed in any limiting manner. Many different ways to deliver information to the OM controller 46 exist that allow characterizing the incoming trains and the departure trains without departing from the spirit of the invention.

A detailed example of a recommended hump sequence computation by the OM controller 46 will be described below in conjunction with the process flowchart in FIGS. 5 and 6.

Figure 5:
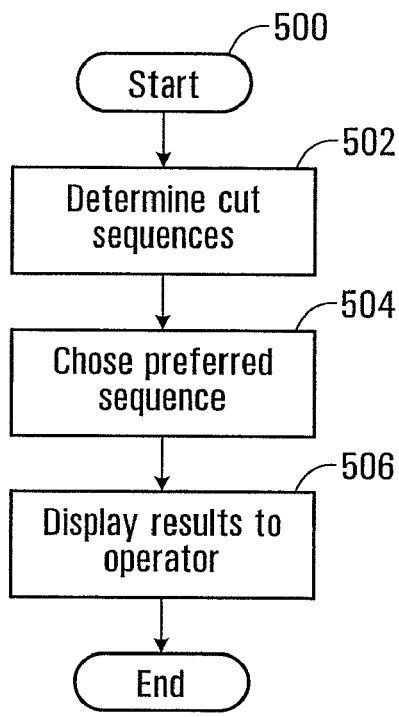
FIG. 5 is a flowchart of a process for identifying a preferred sequence in which railcars are to be switched at the switchyard.
Figure 6:
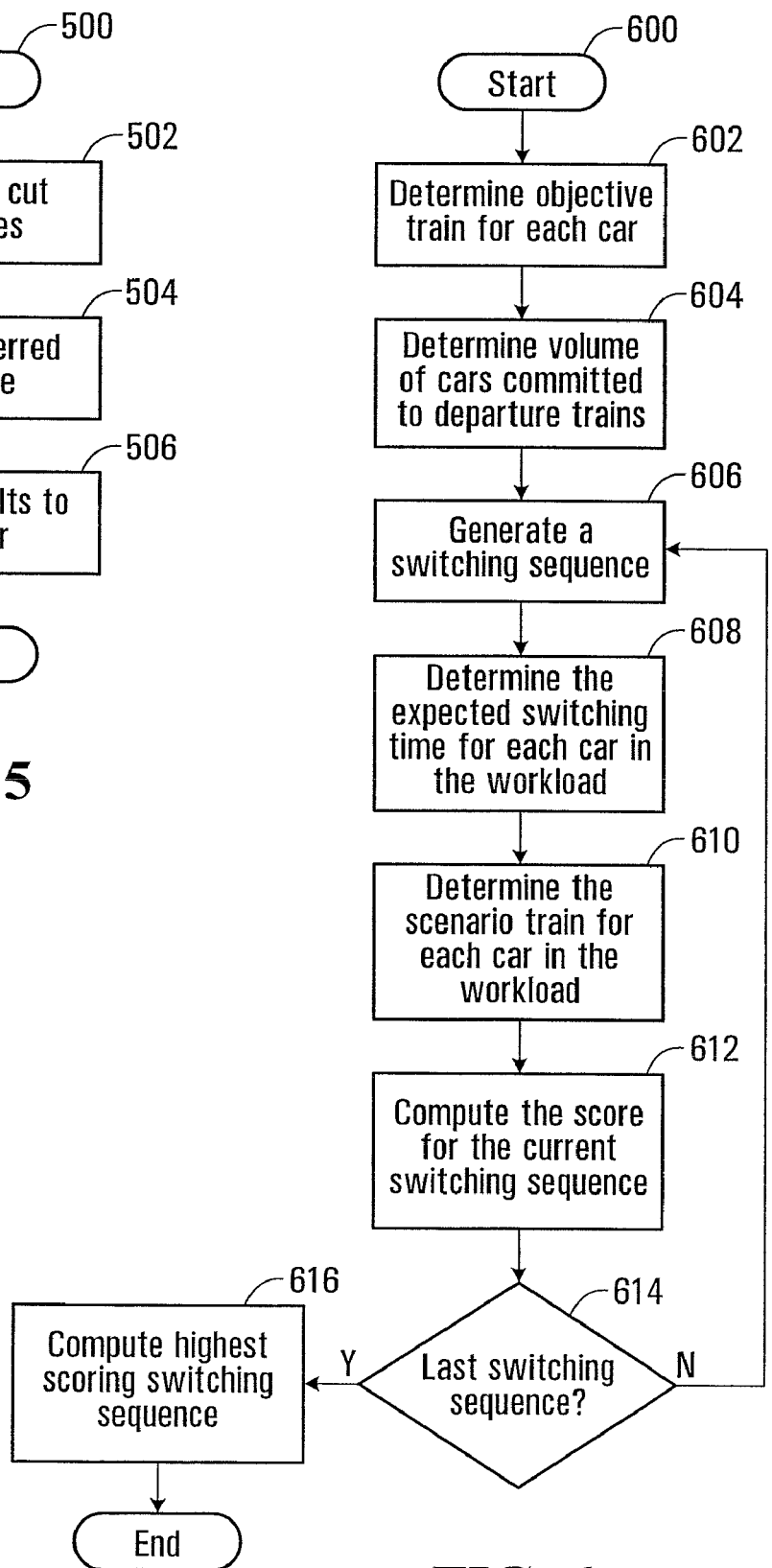
FIG. 6 is a more detailed flowchart of the process shown in FIG. 5.

The flowchart at FIG. 5 illustrates generally the steps of an example of the process for finding a preferred switching sequence of railcars. For the purpose of the following description note that the expressions "humping sequence" and "switching sequence" may be used to designate the same or similar process but the expressions have a different scope. "Humping sequence" refers to a sequence of railcars processed in a hump switchyard, such as the one shown at FIG. 1. "Switching sequence" on the other hand is more general and refers to a sequence of railcars to be processed either in a flat switchyard or in a hump switchyard.

The process includes a start step 500 that is followed by step 502 during which a number of possible sequences in which the railcar cuts can be switched. For example, if three railcar cuts exist, say cut 1, cut 2 and cut 3, a first switching sequence may be cut 1, cut 2 and cut 3, a second possible switching sequence can be cut 2, cut 1 and cut 3, a third possible switching sequence can be cut 3, cut 2 and cut 1, etc. While it is possible at this stage to determine all possible sequences of cuts this is not an absolute requirement. In fact, for large number of cuts that exist in the switching queue and await switching, the determination of all the possible permutations may lead at the next step of the process that is described below to a heavy computational burden, which may not be required in practice. Generally, the number of sequences that will be determined in order to find a preferred sequence is dependent on the computational resources available. At least two sequences need to be available in order to choose a preferred one, but in most practical cases more sequences will be considered to make a choice.

At step 504 the cut sequences determined at the earlier step are evaluated and a preferred sequence is selected. By "preferred" is meant a sequence that offers an advantage over another sequence that is being evaluated. What constitutes an advantage is a matter of choice and dependent on the specific application. For example, if the user of the switchyard considers preferable to minimize the time railcars spent in the switchyard, the metric that will be used to evaluate the sequences and select the preferred one will be the dwell time of the railcars in the switchyard. In such example, step 504 evaluates the different sequences and selects the one that allows reducing the dwell time of the railcars in the switchyard.

In another possible example, the metric used to evaluate the sequences is the number of missed connections. By "missed connection" is meant that a railcar that was destined to be part of a departure train is not available when the train departs. In such case the sequences are evaluated on the basis of missed connections and a preferred sequence is selected.

In many cases, the metric that is being applied may be refined by making a distinction between different types of railcars. For example one may want to distinguish between loaded railcars which usually have a commitment in terms of delivery date or time to a customer versus empty railcars that have no such commitment. If such distinction is made, a higher priority can be given to loaded railcars than to empty railcars. In the case of the "missed connection" metric, the computation could be done in a way to provide more weight to loaded railcars than to empty railcars. In this fashion, the resulting switching sequence will tend to favor loaded railcars such that they make their connections at the expense of empty railcars.

The selection of preferred sequence among the sequences that are being evaluated includes, in one specific example, the computation of a performance status of the switchyard that would be reached for each sequence. In other words, the process will compute a performance status for the switchyard for every sequence and then compare the performance statuses to select the preferred sequence. In one example, when the metric to evaluate sequences is based or factors in railcar dwell time, the performance status of a given sequence can be expressed as a value that reflects the dwell time of all the railcars in the switchyard or a subset of those railcars. In the example where the metric is missed connections (or alternatively successfully made connections) then the performance status of a given sequence can be expressed as a value that reflects the number of missed (or realized) connections with departure trains.

At step 506 the results of the evaluation made at step 504 area displayed to a user. This is done to describe to the user the preferred sequence such that the user can use this recommendation into making a final decision on what the switching sequence will be. The description of the preferred sequence can be done in many different ways without departing from the spirit of the invention. For instance, the preferred sequence can be shown on the display of the user interface 53 alone or listed with the other less preferred sequences to show the user possible options.

A more detailed example of the process for selecting a switching sequence will now be described in connection with FIG. 6. The algorithm on which the process of FIG. 6 is based determines a preferred sequence in which cuts should be humped in order to maximize a score based on railcars making their train connections (in other words, reducing missed connections), when departure trains and blocks of those trains have fixed capacities.

The process starts at 600. During this start step, the user will fix the order of the first few cuts to be humped. The process will then consider the remaining cuts and generate possible sequences of those cuts in order to find a preferred sequence. The evaluation of the possible sequences may be limited to a reasonable number according to the computational resources available.

The score for anyone of the given sequences to be evaluated is the total of the score for all the railcars in the cut (without intent to be bound by any specific definition, in the railroad industry a "cut" refers to any number of railcars attached to be pulled by an engine). Generally, the score for a railcar depends on the objective departure train and the scenario train for that railcar and the departure times of these trains.

At step 602, the objective departure train for each railcar in the cuts being considered is determined. The objective departure train for a railcar is the one that the railcar should connect to based on the process standard in the switchyard. For example, that standard may be set such that railcars that arrive on an incoming train, that need to be humped, have a minimum of 8 hours to connect to departure trains. The scheduled arrival time of the inbound train is used as the starting point for the connection standard, as long as the train arrived early or within 2 hours of its scheduled arrival. If the train is more than 2 hours late, the actual arrival time is used. For trains that are enroute, the same logic is used. For instance, Expected Time of Arrival (ETA)+8 hours if the train is running more than 2 hours late otherwise Scheduled Time of Arrival (STA)+8 hours.

The information necessary to make the objective departure train determination for each railcar is made available from SRS 30 (Refer to FIGS. 3 and 4). Also note that since the OM 46 has access to information on incoming trains, it can perform humping sequence optimization on cuts that include railcars yet to arrive in the switchyard 10.

After the computation at step 602 is completed the results are stored in the memory 49, such as for example as a list mapping the railcars to their respective objective departure trains.

Step 604 determines the volume of railcars that are committed to the departure trains. This is done to assess what is the available space in the departure trains for railcars yet to be switched. The volume of railcars already committed includes:
1. Cars located on the departure yard prior to departure of the outbound train;
2. Cars located on the appropriate classification track, prior to cut-off;
3. Cars specifically selected by the yard operator;
4. Cars placed in outbound status prior to the block-swap cut-off standard (those railcars bypass the humping process).
Note: If there are filler blocks, then one cannot assume that these railcars are committed to outbound trains, since space on filler blocks depends on future arrivals of core block railcars which in turn depends on the hump sequence.

At step 606 a hump sequence is generated. This is done mathematically based on the cuts that are to be evaluated. The following steps 608, 610 and 612 evaluate the sequence. This loop is repeated for all the sequences to be evaluated and a final selection is made later at step 616.

For the sequence selected at step 606, the expected switching time for each railcar in the cuts is determined. The selected sequence is the sequence of cuts which may be cuts that are presently in the switchyard and await switching, cuts on the rehump tracks or cuts expected to arrive (enroute trains).

The computation of the expected switch time for a given railcar is an approximation of the time at which the railcar is expected to be available for switching. Several factors can be used in making this determination, for example:

a. The number of railcars that are presently in the hump switchyard 10 and that are yet to be switched;
b. The rate or arrival of railcars in the switchyard;
c. The rate at which railcars are switched;
d. Resources available to prepare the railcars for switching.

Factor (a) and factor (b) allow determining, at any given time, how many railcars will be in the queue awaiting switching. Recall that this information is readily available to the OM controller 46 from the SRS component 30. Factor (c) can be a rate computed on the basis of the operations in the hump switchyard 10 that occurred in the past couple of hours. For example, a railcar switching rate can be computed on the basis of the number of railcars switched in a given time frame, say the last two hours. A railcar switching rate can also be computed theoretically by taking into account resources available (factor d) in the switchyard to perform the operations necessary to prepare the railcars for switching. One such operation is the mechanical inspection of the railcars. One such resource is the number of crews that can perform the preparation for switching, namely the mechanical inspection. By considering the average number of railcars that a crew can mechanically inspect it is possible to compute the rate at which railcars can be made available for switching. Another possibility is to take into account the rate computed on the basis of switching activities that have occurred in the past previous hours and adjust it to take into account variation in the number of crews, for instance increase the predicted rate if the number of crews increases or decrease the rate if fewer crews will be available.

The OM controller 46 can, on the basis of the above factors, determine for a given railcar, the number of railcars that precede it in the humping queue. Then on the basis of the switching rate, an expected switching time for the railcar can be computed.

Note that the expected switching time for a given railcar is dependent on the particular switching sequence determined at step 604. As the sequence changes, the expected switching times for the railcars will change since the railcars are switched in a different order.

In a specific example of implementation, the following rules are used to compute an expected switch time for each railcar in the sequence:
1. The earliest expected switch time of a given cut is the inspection end time+30 minutes for a cut in an available status, expected inspection time+30 minutes for a cut in inspection or waiting status or if the train is enroute. Note that for cuts in waiting status the inspection start/end times will be based on crew availability and for trains enroute these will be based on crew availability as well as ETA.
2. The actual expected switching start time of the cut is the greatest of the earliest expected switching start time of the cut as calculated at 1 above and the expected switching end time of the previous cut in the sequence. The expected switching end time of the previous cut is computed on the basis of switching rate parameter (number of railcars switched per hour). An example of a switching rate parameter is 125 railcars/hour and an example of inspection rate parameter is 60 railcars/hour per crew based on two crews.
3. The expected switch time of each railcar is based on the expected switching start time of the cut and the position of the railcar in the cut and the switching rate.

After the expected switching time for each railcar of the sequence has been computed, the process continues with step 610 where a scenario departure train is determined for each railcar. A scenario departure train is the earliest train with a cut-off time after the railcar's expected switch time that can carry the railcar's outbound block, and the train has space for this railcar.

The assignment of a scenario departure train is an iterative process. The railcars are examined in the order of their expected switching time. A railcar is assigned to the earliest train in a set of candidate departure trains, which has a cut-off time after the railcar's expected switching time and that can carry the railcar's outbound block and the train has space for this railcar, in other words, the train and block capacities have not been exceeded.

Before assigning a scenario train to a railcar, first, candidate departure trains for that railcar are determined. A candidate departure train is any departure train that can carry the railcar's outbound block as a core block or as a filler block and whose cut-off time is after the railcar's arrival time in the switchyard and the switchyard processing standard, as discussed earlier. Obviously, a candidate departure train also takes into account the destination of the railcar. Departure trains that cannot carry the railcar to the intended destination are not considered. Also, departure trains that have a Scheduled Departure Time (SDT) that is before or after the objective departure train's SDT, can be suitable candidate departure trains, hence they are considered when determining the scenario train. However, note that in this example, a departure train that has an SDT that is before the SDT of the objective train can be a suitable candidate departure train only when it can carry the railcar in a filler block.

The set of candidate departure trains determined for each railcar may be augmented to include departure trains that depart before the railcar's arrival time plus the switchyard processing standard. This option may be useful in instances where the railcar is processed earlier than the switchyard standard and is able to connect to this train.

Before starting the iterative process, the remaining capacities of the candidate departure trains (for all railcars) are initialized by subtracting from the actual capacities the space taken up by railcars already processed and committed to the trains as per step 604 above.

The iterative process is a series of passes that consider all the candidate departure trains and assign each railcar to a candidate departure train that becomes the scenario departure train for that railcar.

The iterative process starts with a first pass. As indicated earlier the railcars are examined in the order of their expected switching time. In this pass only those candidate departure trains that have a core block for a railcar are considered for assignment. For instance, consider the first railcar of the first cut in the sequence. This railcar is processed before any other railcar since it has the earliest expected switching time. The OM controller 46 that has previously identified the candidate departure trains for that railcar will select the one that has:
1. the earliest cut-off time after the expected switching time of the railcar; and
2. has a core block for that railcar.

The selected train by the OM controller 46 is tentatively assigned to the railcar as a scenario departure train and that departure train and block remaining capacities are reduced by one.

Once the first pass is completed a second pass is initiated which performs a broader assessment and attempts to find space for the railcar in a departure train either in a core block or in a filler block. The second pass processing first determines if there are any activated filler blocks on anyone of the candidate departure trains determined for the railcar. If there are no activated filler blocks on anyone of the candidate departure trains then the second pass is not required and the scenario departure train tentatively assigned to the railcar during the first pass is now confirmed as actual scenario departure train. On the other hand, if there are activated filler blocks on one or more of the candidate departure trains, first a computation is done to assess the capacity of the filler blocks. The capacity of a filler block is computed as the train's capacity minus the space taken up by all the core block railcars assigned to this train, such as the railcars assigned in the first pass. Note that if more than one filler block for a given candidate departure train has been activated, then the filler block capacity computed above is jointly shared by the several filler blocks and it will be allocated on a First-In, First-Out (FIFO) basis.

The second pass implements a broader assessment because candidate departure trains that include both core and filler blocks are considered for assignment. A railcar will be assigned to the first eligible train that can carry the railcar, either in a core block or in a filler block (which implies that the train has sufficient remaining block and train capacity). For example, in a case where a candidate departure train that can carry the railcar in a filler block but it has a cut-off time that is after the cut-off time of the scenario departure train, then the OM controller 46 will retain the scenario departure train determined during the first pass. However, in an opposite case, where a candidate departure train with a filler block is available and it has a cut-off time earlier than the cut-off time of the scenario departure train tentatively assigned during the first pass, then the tentative solution is disregarded and the scenario departure train assigned to the railcar becomes the one with the filler block. Once this assignment is made, the train capacities are adjusted. The adjustment includes:
1. reducing the filler block capacity of the newly assigned scenario departure train by one;
2. reducing the train capacity of the newly assigned scenario train by one;
3. increasing the core block capacity of the previously tentatively assigned scenario departure train by one (to negate the previous capacity reduction); and
4. increasing the train capacity of the previously tentatively assigned scenario departure train by one (to negate the previous capacity reduction).

In certain cases a third pass may also be required. For instance, consider the situation where a train TA has a filler block for block B and train TB has a core block for block B and TA departs before TB. Now let's say there is a block C for which the core block is on train TC and a filler block on train TB and TB departs before TC. In such situation, a block B railcar may shift to train TA and thus release capacity on TB. If block C railcars are overflowing TC then they should be shifted forward to TB. For this reason a third pass may be desirable.

In general, the process may benefit from as many additional instances of the third passes as the length of the chain of blocks connected in the way described above, minus one. For instance, if there is a chain of three blocks linked in this way the third pass may need to be repeated twice.

Note that before any instance of the third pass is initiated the capacities of the filler blocks should be updated. This is done by examining the solution from the previous pass as follows:
1. Check for the following three conditions:
   a. There is a train T which has unused train capacity and has an activated filler block for block B;
   b. The filler block is at capacity;
   c. Some railcars of block B are assigned to a train that departs after train T (because block B on train T is full);

2. If the conditions under 1 are met then:
   a. New capacity of the filler block on train T is equal to the capacity of the filler block in the previous pass plus the unused capacity of train T.

Finally, a check is performed for a last pass. If at the end of an instance of the third pass the three conditions described above under 1 are met then another instance may be necessary, otherwise not.

Note that even if three conditions are met, it may happen that no railcar that has been assigned to a later train can shift up to an earlier train (which was underutilized in the previous pass instance) due to expected switching time constraints. In this case there will be no change in train length from one pass to the next. If this condition is verified then no more instances of the third pass are made.

The above-described process is repeated for every railcar in the sequence generated at step 606. So, when step 610 is completed, the OM controller 46 produces a list that associates each railcar with a given scenario train, as well as the candidate trains and their respective capacities. This list will be used in the next step to compute a score.

Step 612 follows step 610 and computes for each railcar a score that is used as a basis to rank the various switching sequences. More specifically, step 612 applies scoring rules based on the objective train, the scenario train and the candidate trains for the railcar. Below is a possible example of scoring rules:

1. If the scenario train is the objective train (successful connection is expected), score=+1;
2. If the scenario train's SDT is before the objective train's SDT, score=+1;
3. If the scenario train's SDT is after the objective train's SDT, and any candidate departure train departs before the scenario train is expected to be under capacity, score=−1;
4. If the scenario train's SDT is after the objective train's SDT, and all candidate trains departing before the scenario train are full, score=0. However, if the scenario train is scheduled to depart within 12 hours after the objective train then the score is =+0.5.

Step 612 computes a score for each railcar using the above rules. It should be expressly noted that those rules are mere examples and different rules can be implemented without departing from the spirit of the invention.

The step 612 completes by computing a collective score for the sequence generated at step 606. The collective score is the sum of the individual scores of the railcars making up the entire sequence. In this example, the collective score expresses the performance status of the switchyard 10 that would be reached should the railcar sequence be run.

Step 614 is a decision step. If the sequence processed last is the last sequence, in other words step 606 cannot generate any other different sequence, then step 614 is answered in the negative and the process continues at step 616. Otherwise the processing returns to step 606 where a new sequence is generated and processed by steps 608, 610 and 612 as discussed earlier. This continues until all the sequences have been exhausted.

Step 616 compares the collective scores for all the sequences and selects the preferred one. In this particular example, the preferred sequence is the one that has the highest collective score. In other words, the preferred sequence is the one that would put the switchyard in the highest performance status. In the event there is a tie, a possible approach is to select the sequence that has the lowest number of missing connections for certain railcars, for example loaded railcars versus empty railcars. Another possible approach to break the tie is to select a sequence among the sequences that are tied that is closest to the current sequence, so as to deviate least from the current yard work plan. Again, the reader will appreciate that other factors can be relied upon in selecting a sequence in the event of a tie, as missed connection or similarity to the current sequence are only examples of metrics that can be used.

The above example of implementation uses a computational method that evaluates all the possible sequences in a given number of cuts. For some applications, in particular those where the number of cuts to evaluate exceeds 10, the computational requirements become significant since the number of possible sequences grows to large numbers. In this case variants can be implemented to reduce the computational complexity. One such variant is the so called "Strong Optimality" (SO) property that can be used to limit the number of sequences that need to be considered. Assume for the sake of this example that sequences of 10 cuts need to be evaluated. An evaluation method based on the SO property does not look only at complete sequences of the 10 cuts. Rather, the method builds up from smaller sub-sequences (a sequence of a subset of the 10 cuts) and reduces the search space through evaluation of these sub-sequences.

For the purpose of this example, a sequence is considered Strongly Optimal (SO) if it has the highest score of all other sequences of the same cuts and its hump completion times is not greater than that of any other sequence.

Consider the following example:

If the method is to evaluate 5 cuts—Cut Nos. 1, 2, 4, 6 and 7, there are 5!=120 possible sequences. Let's say S(1,6,4,2,7) is the score of sequence 1,6,4,2,7, and T(1,6,4,2,7) is its completion time. If 1,6,4,2,7 is an SO sequence then for any other sequence, say 1,2,4,6,7, S(1,6,4,2,7) is >=S(1,2,4,6,7) and T(1,6,4,2,7) <=T(1,2,4,6,7).

The SO property implies that an extended sequence derived from an SO sequence will be superior to a similar extension of any other sequence. That is, in the above case the sequence 1,6,4,2,7,N will be better than the sequence 1,2,4, 6,7,N in terms of score whatever the cut N is.

A point to note is that the SO sequence may not be unique (a tie situation). There can be two or more sequences with the same highest score. In that case a possible approach is to arbitrarily choose one of those SO sequences for further consideration and neglect the remaining ones, or use anyone of the solutions discussed earlier for breaking the tie.

In some cases a possibility may arise that an SO sequence does not exist for a subset of the cuts. In that situation two or more non-Strongly Optimal or NSO sequences will be in existence.

Using the same example as above:

Let's say 1,6,4,2,7 is the sequence with the highest score but its completion time is longer than that of another sequence. That is, S(1,6,4,2,7)>S(1,2,4,6,7) but T(1,6,4,2,7) >T(1,2,4,6,7). Then both 1,6,4,2,7 and 1,2,4,6,7 are NSO sequences. In this case it cannot be said that the score of the extended sequence 1,6,4,2,7,N is greater than that of 1,2,4,6, 7,N because the hump start time of cut N in the latter case may be earlier. This could avoid some missed connections and increase the additional score associated with the cut N.

When a subset of cuts does not have an SO sequence a set of NSO sequences can be identified such that all other sequences not in this set have both a lower score and a longer completion time than any of the NSO sequences. The number of NSO sequences may be quite large (in the extreme case all possible sequences of a subset of cuts may be NSO).

In order to enhance optimality it has been found advantageous to keep track of all the NSO sequences as the process builds upon them. As longer sequences are being built, the set of NSO sequences can expand or contract. However, in order to limit the computation one possible option is to keep no more than say, 3 NSO sequences for any subset of the cuts being considered, realizing that this may cause some loss of optimality. The choice of the number to keep is a trade-off between computation speed and solution quality.

The process under this variant generates and evaluates sub-sequences in iterations rather than generating complete sequences as in the complete enumeration technique described earlier. It starts by looking at sequences of length 2 in the first iteration, then in the second iteration it looks at sequences of length 3, and so on. One possible implementation is to consider, at most, 10 workloads/cuts for optimization (that is, if the switchyard operator has fixed the hump sequence of the first 3 cuts, say, then the OM controller will determine the best sequence for the cuts numbered 4 through 13).

The sequence generation is described below for the simple case where the SO property holds for every subset of cuts.

1. First Iteration

In the first iteration all 2-cut sequences are examined to determine the SO sequence for each 2-cut combination. The number of 2-cut combinations is 10C2=(10*9)/(1*2)=45.

For each combination all possible sequences are evaluated. For example, for the combination [3, 5] the cost and time of the two possible sequences 3, 5 and 5, 3 is calculated. Let's say the sequence 5, 3 is SO. It is kept as a candidate. The sequence 3, 5 need no longer be considered.

At the end of the first iteration an SO sequence will be available for each of the 45 2-cut combinations together with its cost and time.

2. Second Iteration

In the second iteration 3-cut combinations are evaluated. This is done by extending the SO sequences of the 2-cut combinations determined in the previous iteration and evaluating them to determine the SO sequence for each 3-cut combination.

The number of 3-cut combinations is 10C3=(10*9*8)/(1*2*3)=120.

For any given combination the following process is implemented. Let's say the combination [1,3,5] is being considered. By virtue of the SO property only the SO sequence of [1,3] needs to be evaluated, extended by cut number 5, the SO sequence of [1,5] extended by cut number 3, and the SO sequence of [3,5] (which happens to be the sequence 5,3) extended by cut number 1. The best of these three extended sequences is the SO sequence of cuts [1,3,5].

Thus only 3 sub-sequences need to be computed and compared to determine the SO sequence for each 3-cut combination.

At the end of the second iteration an SO sequence will be available for each of the 120 3-cut combinations together with its cost and time.

3. Subsequent Iterations

The subsequent iterations follow a similar pattern. In the kth iteration 10C(k+1) combinations of length k+1 will exist and for each combination one needs to calculate and compare k+1 extended sub-sequences (derived from the SO sequences of the previous iteration).

4. Ninth and Last Iteration

At the end of the 8th iteration 10C9=10 SO sequences of length 9 are in existence. The process needs to calculate and compare 10 extensions i.e. extend each of the 10 SO sequences of length 9 by the remaining cut in order to obtain the optimal sequence of all 10 cuts.

5. Case with NSO Sequences

The method described above is essentially the same even when for a particular combination of cuts there is no SO sequence. The process then keeps all (and in this specific example at most 3) NSO sequences associated with this combination. In the next iteration this will increase the number of calculations and comparisons accordingly. However, at the end of the next iteration it is possible for the number of NSO sequences to increase or to decrease.

Figure 7:
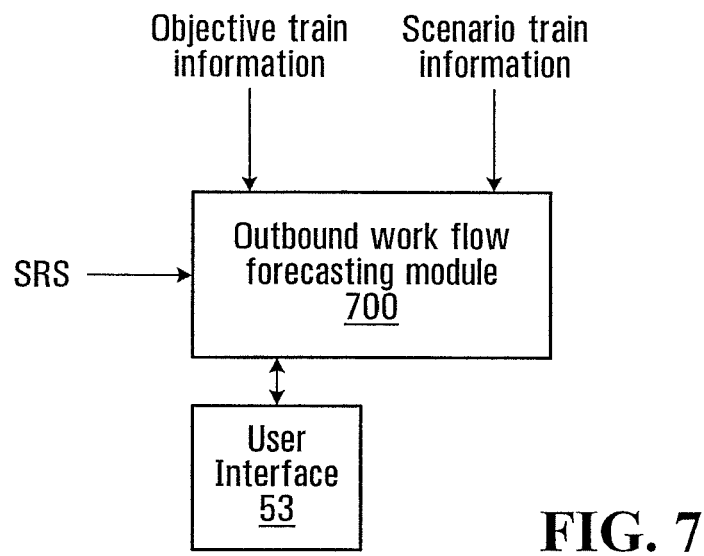
FIG. 7 is a functional block diagram of an outbound workflow forecasting module.

FIG. 7 illustrates an optional enhancement to the OM controller 46. The optional enhancement is an outbound workflow forecasting module which provides a user, such as the yard master, with a view of departure trains that the switchyard is to build. In this example, the workflow forecasting module creates a projection of what the departure trains will look like, based on the predicted workflow. The predicted workflow is the railcar traffic that the switchyard is processing and optionally railcar traffic that the switchyard will process in a short while. In a specific example, the railcar traffic information that is used to generate the outbound workload forecast includes railcars that are yet to be switched into classification tracks, such as railcars presently in the switchyard (and that may be currently in the initial switchyard processing stages) and also railcars that have not yet arrived in the switchyard but for which an Estimated Time of Arrival (ETA) exists.

The outbound workflow forecasting module is software implemented and generates a series of views that show to the user information pertaining to the railcar traffic that will be available to scheduled departure trains for transport out of the switchyard. Certain safeguards are also included in the system to show when the available railcar traffic exceeds the capacity of departure train, allowing the user to manually adjust settings to correct the situation.

In FIG. 7, the outbound workflow forecasting module is shown by the reference numeral 700. The outbound workflow forecasting module receives as input information relating to railcar traffic for processing by the switchyard. As indicated earlier, the railcar traffic includes railcars that have arrived in the switchyard and optionally railcars that are yet to arrive in the switchyard. In a specific example of implementation, this information is conveyed by the objective train information and the scenario train information computed for each rail railcar, as discussed earlier in this specification. In other words, the outbound work flow forecasting module 700 receives for each railcar of the pool of railcars that constitutes the railcar traffic, the computed objective train information and scenario train information.

In addition, the outbound workflow forecasting module also receives information from SRS about the departure trains, such as the identification of each train, the estimated time of departure of each train and the train blocks making up the trains. The information that is available from SRS is discussed earlier in the specification.

The information that is output by the outbound workflow module 700 is conveyed to the user interface 53. In the specific example of implementation, the user interface includes a display on which the information is shown to the user. The user interface also includes inputs, which allow the switchyard operator to input data in the outbound workflow forecasting module 700, as it will be discussed below.

Figure 8:
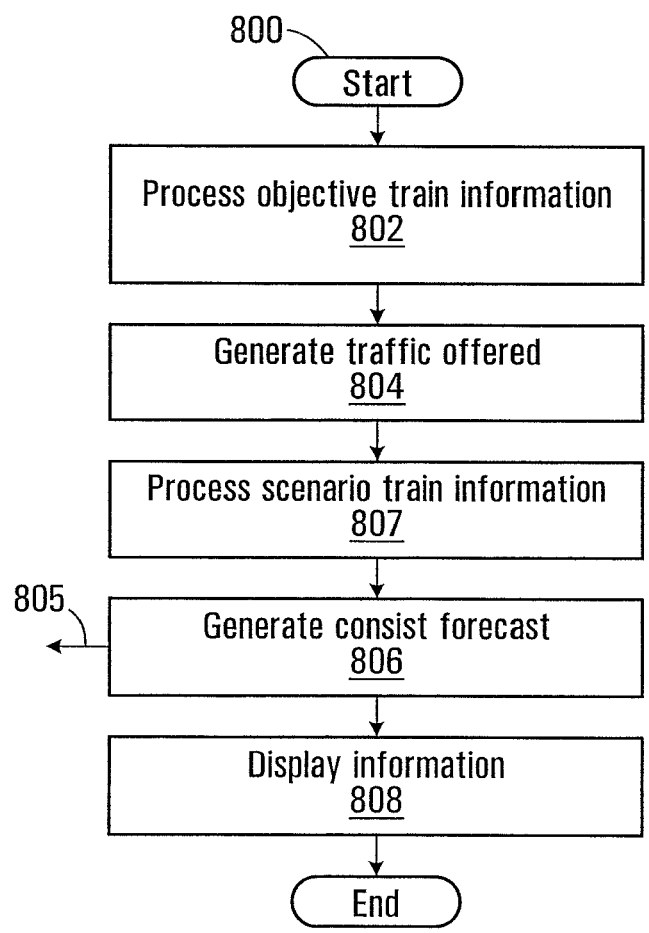
FIG. 8 is a flowchart of a process implemented by the workflow forecasting module shown in FIG. 7.

The process performed by the outbound workflow module on the information that is input into it is depicted by the process shown at FIG. 8. The process starts at step 800 and computes for every departure train a forecast of the railcar traffic that will be available to that train for transport out of the switchyard. In the specific example illustrated by the process of FIG. 8, the forecast of the railcar traffic includes two components, one being a rough projection of the railcar traffic and one being a more refined and accurate projection of the railcar traffic.

The rough projection, referred to as "traffic offered", is computed at steps 802 and 804. Specifically, the objective train information for each railcar in the switchyard (including those on incoming trains) for which this parameter is computed is classified per train block and subsequently per train to which the railcars belong. The purpose is to obtain a rough projection valid at the ETD of every departure train, of the railcars that will be available for pick-up by that train. This is shown by processing step 804. Traffic offered could be from various locations, namely en route trains, receiving tracks of the switchyard, classification tracks of the switchyard or departing tracks of the switchyard. To include a railcar in the traffic offered in connection with a particular departure train, the objective train of that railcar should be that particular departure train.

Note that the traffic offered is not static and changes as the objective train information changes. As the objective train may be periodically recomputed, the objective train may change over time. This change will have an impact on the traffic offered. Accordingly, the projection of traffic that will be available to departure trains will change as railcars are being processed by the switchyard. Those changes will be greatest for departure trains having the furthest ETD. This is because the traffic offered projection is based on objective train computations for railcars that are in the early switchyard processing stages or have not yet arrived and for those railcars the objective train computations can change. In contrast, as the railcars progress through the switchyard, in particular as the railcars are switched and classified, the objective train information is much less likely to be changed. Therefore, as the EDT for a given train approaches the current time, the traffic offered projection progressively firms up to a point where it is fixed and no longer changes.

The refined projection of the railcar traffic, referred to as "consist forecast" is computed at steps 807 and 806. Specifically At step 807 the scenario train information is processed to generate at step 806 the consist forecast. The consist forecast would typically be a subset of the traffic offered and it is generated on the basis of the scenario train information input into the outbound work flow forecasting module 700. Typically, the processing step 807 will examine all the railcars in the group of railcars that constitute the traffic offered for the present departure train to extract those having a scenario train which matches the present departure train. Recall that the objective train for a railcar is, in the specific examples provided earlier, a connection standard computed on the basis of the time of arrival of the railcar to which is added a certain time processing standard. In contrast, the scenario train, in the examples provided earlier is a refined version of the objective train that takes into account the various processes taking place in the switchyard. For instance, the scenario train of a railcar may change depending on the computed switching sequence for that railcar. Accordingly, the consist forecast is a more accurate projection of the railcar traffic that will be available to the departure train.

In addition, the processing at step 807 also determines if the consist forecast established on the basis of the scenario train information will fit the capacity of the departure train. Several capacity limits can be considered, namely train length limit, train weight limit or number of railcars limit. If any of those limits is exceeded, a message is produced to advise the user. The limits applicable to a given departure train can be input into the system in different fashions. For instance this information can be associated with the train object describing the departure train, manually input by the user or inferred depending on particular conditions, such as for example the specific departure track the train occupies. The departure track may be limited in length and, therefore accept a limited number of railcars. This limit condition only applies to departure trains that occupy that particular departure track; longer departure tracks will not have those limits. Also, there may be instances where access to motive power is limited and thus the departure train may be assigned fewer locomotives than the projected traffic offered requires. In such instances, a weight limit will be enforced and a message will be issued to the switchyard operator to indicate that a limit has been exceeded and also to indicate the maximal train weight permissible for the available motive power.

Corrective action that may be taken when the consist forecast computed on the basis of the scenario train information exceeds the capacity of a departure train can be manual or automatic. A manual corrective action will normally require the user to specify what corrective action is to be implemented by entering commands via the user interface 53. Specifically, the user may chose to close one or more train blocks earlier such as to limit the number of railcars in the departure train. The choice of the blocks to close earlier is left to the discretion of the user. An automatic corrective action may also be considered where train blocks are closed in a random fashion or by applying any suitable logic rules.

Once a corrective action has been input into the system, which is depicted in FIG. 8 by the arrow 805, an update on the scenario train information for the railcars that are left behind, and those that are upstream in the switchyard processing is performed. A new computation is effected, as discussed earlier, this time taking into account that the departure train to which railcars where previously allocated, is no longer available. Most likely the new scenario train selected for the railcars will be the next departure train (for the correct destination) or a subsequent departure train. Note that the update may trigger a ripple effect, since the re-allocation of railcars to a new train may remove space that was reserved for other railcars, which in turn may need to be pushed back to yet another departure train. Since the OM controller 46 is designed to constantly re-compute the scenario train for railcars, in particular those that are yet to be switched, changes resulting from corrective actions described above can be in general quite easy to accommodate.

As the new scenario train for the railcars left behind is computed, the consist forecast computed on the basis of the scenario train information will change to reflect the fact that the railcars are now planned to be part of a subsequent departure train.

The corrective actions and the subsequent adjustments to the traffic offered occur in most instances before the departure train is being built. Accordingly, the forecasting operation not only allows to "view" what departure trains will look like but also to proactively adjust the trains composition such that they fit existing limits.

The information produced by the outbound workflow forecasting module 700 is displayed to the user via the user interface 53. This is also shown at step 808 in FIG. 8. FIGS. 9 to 17 illustrate are examples of screen views that show the manner in which the information is presented and the various commands that are available to the user.

FIG. 9 is the outbound Line Up screen used to monitor the processes leading up to the departure of all trains. It helps manage the flow of railcars to outbound trains and the identification of the candidate traffic that will make those trains. Through that screen, the user also has access to other screens to manage individual outbound trains.

The following columns of information are displayed on the main grid:

Outbound departure trains: The train ids departing the station (i.e. M 30131-15)

STD: Train Schedule departure time

ETD: Adjusted scheduled departure time

Status: The stage of the process in which the cut is

Departing Track: The outbound track identifier (i.e. W001)

Multiple Outbound tracks: Identified by a "+" when more than one outbound track is used to build the train. This field expands to display all the departing tracks used and the actual status of the tracks Traffic Offered: Number of railcars, feet and tonnage to be available to the outbound train within yard connection standards Consist Forecast: Number of railcars, feet and tonnage projected to make the train Last railcar: The time at which the last railcar included in the forecast will be processed. This column will also display as a tool tip the actual time at which the last railcar was processed The table can be sorted by Schedule Departure time (STD), Estimated Departure time (ETD) or Train ID.

The table can be filtered to show train departure by yard area.

From the screen in FIG. 9, the traffic details for an outbound train can be viewed by clicking on the appropriate Train ID. This will lead to the screen shown in FIG. 10, The user can do outbound management (adjust the train block, add a fill block, close the block, set the block footage and change the train block cut-off to correct overflow situations). This will be described in connection with FIGS. 14 and 15.

The outbound railcar traffic that will make up the train will be forecasted automatically by the system, as discussed earlier. The user can also manually forecast the traffic that will make up the departure train via the Train details screen to generate an outbound forecast, as discussed in connection with FIGS. 16 and 17.

The following rules are applied in connection with the various parameters presented in FIG. 9:

Scheduled/Estimated Train Departure (ETD): In a specific example, if the ETD is within 29 minutes of the STD the background color of the ETD is neutral, if it is between 30 and 59 minutes late the background is YELLOW and if the ETD is 60 minutes or more late it is RED. If the ETD is in the past, the background should turn BLUE.

Status parameter: Initially, an outbound train has a status of "Planned". When the outbound train is ready to be built the status changes to "Pull Down". Once the pull down is complete or a track is available for inspection, the train or track (via expandable departing track column) is changed to "Set" outbound inspection. When the mechanical group starts inspecting the outbound train the status is changed to "Inspection". Once the inspection is complete, the train is changed to "Departing" status indicating that the train is ready to depart as soon as power and crew are in position.

Traffic Offered parameter: This section of the table shows the rough volume of railcar traffic that is projected to be available in time for the outbound train according to yard connection standards—that is, the railcars where the objective train id equals the outbound train. Fill block traffic is not counted in the offered count, as long as it is not included specifically by the user. If the volume of traffic offered exceeds the capacity of the outbound train, the footage and/or tonnage number is highlighted with a RED background. This message prompts the user to specify block restrictions to shape what traffic will actually be handled on the departure train, and to make alternative plans for the traffic that cannot fit. If alternative plans are made to move part of the traffic early (e.g. a fill block on an earlier train), the traffic offered is increased for the train that receives the early traffic, and remains unchanged for the original objective train.

Consist Forecast parameter: This section of the table shows a more refined volume of railcar traffic that is projected to be available in time for the outbound train according to scenario train computations. It is possible that the consist forecast as computed on the basis of the scenario train exceeds the capacity of the outbound train in terms of footage, or other. When this happens the forecast shown will be a subset of the computed consist forecasts, taking into consideration the hump plan, the capacity of the outbound train, block restrictions, and alternative plans made to handle the overflow. As the hump plan changes (as a result of changes in priority, hump rate, inbound inspection performance, and/or traffic volume) the outbound projections automatically adjust. As the departure time approaches, the accuracy of the forecast increases. Once the train cut-off time has passed, these numbers should normally be static.

Last railcar parameter: This is the time that the last railcar in the consist forecast (Scenario Train ID=Outbound Train) will be processed and, therefore, available for the outbound train. This information can be used to plan early pull downs, and is also useful for monitoring the impact of the departure time on dwell. If the last railcar is always available well before the scheduled departure, it could create a network opportunity to advance the scheduled departure. If the last railcar is available, the Last railcar column displays "Now" with the background of this field in GREEN. The actual time at which the last railcar associated to this train (=Scenario Train ID) was processed is also displayed as a tool tip.

The train details screen, shown in FIG. 10 is used to monitor the content of specific outbound trains. It shows a train's core and fill block information down to the railcar level. Each detail level provides information to qualify the train's system-generated consist forecast. The user can then use this information to generate a manual forecast.

The columns displayed in the train details screen are:

Top Grid (For train blocks)

Trn Block: The train blocks defined for that specific train, not editable.

Incl: This block is included in the outbound forecast (Yes or No, defaulted to Yes for core blocks and to No for fill Blocks), editable field.

Cut-Off: The cut-off for a block (defaulted to the train's one), editable field.

Limits (Ft): Restriction on the block length (normally blank), editable field.

Offered, Processed and Consist Forecast railcars: Number of railcars for the train block (loaded or empty) that are offered, processed or forecasted for the selected train id, not editable.

Offered, Processed and Consist Forecast Ft: The total railcar feet of all railcars for the train block that is offered, available or forecasted for the selected train id, not editable.

Offered, Processed and Consist Forecast Tons: The total gross tons of all the railcars for the train block that is offered, available or forecasted for the selected train id, not editable. Offered, Processed and Consist Forecast Totals: The summation of the railcar number, feet and tons for the train block that is offered, available or forecasted for the selected train id is displayed at the bottom of each column, not editable.

Manual Forecast Total: The summation of the traffic selected manually by the user, editable field.

Bottom Grid (for filler blocks): The same columns are displayed as for the core blocks The user can expand a specific train block from the screen in FIG. 10 to the Track/Train level, shown in FIG. 11, by selecting the desired block. The columns displayed in the Track/Train level section in FIG. 11 are:

Track/Train: The current location of the group of offered railcars for the selected block (Track or Train).

Process Time: The time at which the last railcar in the group will be made available (its classification time). If the group of railcars is available for the outbound train (classified/processed), this field shows NOW. It otherwise indicates the estimated time the last railcar of the track is going to be processed.

To Track: The target track of the group of offered railcars for the selected block.

Offered, Processed and Consist Forecast railcars: Number of railcars for the block's track (loaded or empty) that are offered, processed or forecasted for the selected block.

Offered, Processed and Consist Forecast Ft: The total railcar feet of all railcars for the block's track that is offered, available or forecasted for the selected block.

Offered, Processed and Consist Forecast Tons: The total gross tons of all the railcars for the block's track that is offered, available or forecasted for the selected block.

The user can expand a specific train to the location level by selecting the desired train. This is shown in FIG. 12. The columns displayed in the location level section are:

Location: The location of all railcars on the train or scheduled to be picked up by the train Offered, Processed and Consist Forecast railcars: Number of railcars for the block's track (loaded or empty) that are offered, processed or forecasted for the selected block.

Offered, Processed and Consist Forecast Ft: The total railcar feet of all railcars for the block's track that is offered, available or forecasted for the selected block.

Offered, Processed and Consist Forecast Tons: The total gross tons of all the railcars for the block's track which is offered, available or forecasted for the selected block.

The user can expand a specific location to the railcar level by selecting the desired Location. Alternatively, for tracks at the track/train level, the user can go directly to the railcar Level by selection the desired Track. The columns displayed in the location level section shown at FIGS. 13A and 13B are:

Car Initial
Car Number
L/E: Load/Empty
Feet: railcar length in feet
Tons: railcar weight in tons
Car Kind
Contents: railcar contents The following rules are applied in connection with the screens shown in FIGS. 10 to 13A and 13B.

Block fields: Sorted in train block sequence order (for outbound). The front-end block is displayed at the top row.

Incl field: If set to Yes, the train block will be included into the outbound train forecast according to its limitations and the train capacity. If set to No, the train block won't be included in the consist forecast.

Cut-off: Can be adjusted by the user. Not displayed if the block is not included (Incl.=N).

Limits: Can be set by the user. Blank if no limit was entered.

Processed: Traffic Offered already switched that qualifies to be moved on the selected departure train ID. Traffic processed can be from classification tracks, departure tracks, or receiving tracks in outbound status.

Consist Forecast: traffic offered included to be part of the outbound train based on the restriction set by the system (default) or by the user, until the Spec limit of the train is reached. Traffic is evaluated by switch time. To qualify, a railcar's scenario train should be the designated as the particular departure train.

If the Consist Forecast volume for a block is less than offered, that block is highlighted. This indicates that some of the traffic offered for the block will have to be left behind due to a capacity constraint.

Manual Forecast: Is equal to the consist forecast as long as no manual forecast has been built.

Now, with reference to FIG. 14, the user can modify a train's system-generated forecast by adjusting block settings on the Train Details screen (FIG. 14). More precisely, the user can decide to include or exclude blocks (Fill or Core), adjust a block's cut-off time, and modify or set footage limitations on the train and its constituent blocks. Specifically, on the train details screen (FIG. 14), the following fields are editable at the block level only:

Incl: This block is included in the Consist Forecast (Yes or No defaulted to Yes for core blocks and to No for fill blocks).

Cut-off: The cut-off for a block (defaulted to the train's one).

Limits Feet: Restriction on the block length (normally blank).

Spec Limit: Value can be changed manually at the train level.

A calculator selection (new column in FIG. 15) is also available to set the block Limit. This calculator allows for selecting traffic down to the railcar level.

The following rules are applied in connection with the screens shown in FIGS. 14 and 15.

Cut-Off: Modification to the cut-off will affect the train assignment process. A change in cut-off will affect railcars that have not yet been processed. Normally, as the cut-off is pushed to a later time, more railcars will be included in the traffic offered and consist forecast due to a re-assignment of their scenario Train to the current outbound train. Conversely, if the cut-off is moved to an earlier time, railcars scheduled to be processed after the cut-off will be removed from the consist forecast but not from the traffic offered since their objective train is not impacted. The user can update the cut-off to any time from now to ETD.

Limits (Ft): If not blank, this value limits the block's consist forecast (Cars, Feet, and Tons) through the footage. The block will only be restricted to respect the train limit otherwise. Since a train block can have a core portion and a fill portion, limits can be set for these portions separately.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A method for building departure trains in a switchyard having a switch, said method comprising:
   a. providing a data processing entity including a CPU and a machine readable storage encoded with software for execution by the CPU, the data processing entity:
      i. computing for railcars yet to be switched by the switch and having respective destinations outside the switch yard, respective approximate times indicating when the railcars are expected to be available for pickup by a departure train;
      ii. associating the railcars to respective departure trains, the departure trains being characterized by respective estimated departure times (EDTs) and destinations, the associating including:
         1. comparing the respective approximate times with the EDTs of the departure trains;
         2. selecting for each railcar a departure train on the basis of the comparing and that also has a destination that corresponds with the destination of the railcar;
         3. generating for at least one of the departure trains a departure train build plan identifying railcars associated to the at least one departure train;
   b. building a departure train at least in part on the basis of the departure train build plan.

2. A method as defined in claim 1, including a user interface coupled to an output of the data processing entity for communicating the departure train build plan to a user.

3. A method as defined in claim 2, wherein the departure train build plan identifies railcars that have arrived in the switchyard and railcars inbound for the switchyard and yet to arrive at the switchyard.

4. A method as defined in claim 2, wherein said software generating an alert to a user when a volume of railcars in a departure train build plan for a particular departure train would exceed a capacity of the particular departure train.

5. A method for building departure trains in a switchyard including a switch and classification tracks, said method comprising:
   a. providing a data processing entity including a CPU and a machine readable storage encoded with software for execution by the CPU, for:
      i. processing with the software input data identifying railcars that have not yet been switched into classification tracks for assigning the railcars to respective departure trains:
      ii. computing with the software a forecast of railcar traffic that will be available to individual ones of the departure trains for transport out of the switchyard at least in part on the basis of said assigning, the forecast of railcar traffic in connection with a particular one of the departure trains including an identification of one or more of the railcars assigned to the particular one of the departure trains;
   b. building one or more departure trains on the basis of the forecast.

6. A method as defined in claim 5, wherein said software determines prior to assigning a railcar to a particular departure train if space is available for the railcar in the particular departure train.

7. A method as defined in claim 5, including releasing output data describing the computed forecast of railcar traffic available for at least one of the departure trains from an output of the data processing entity to a GUI.

8. A method as defined in claim 7, wherein said GUI includes an information field displaying to a user an EDT of the at least one departure train.

9. A method as defined in claim 6, wherein said GUI includes an information field displaying to a user current status information of the at least one departure train.

10. A method as defined in claim 8, wherein the current status information distinguishes between a departing status associated with a departure train that is ready to depart and an inspection status associated with a departure train undergoing inspection.

11. A method as defined in claim 8, wherein the current status information distinguishes between a departing status associated with a departure train that is departing and a planned status associated with departure train that is planned to be build.

12. A method as defined in claim 6, wherein said GUI includes an information field displaying to a user a departure track of the switchyard assigned to the least one departure train.

13. A method as defined in claim 6, wherein said GUI includes an information field displaying to a user the number of railcars associated with the at least one departure train.

14. A method as defined in claim 6, wherein said GUI includes an information field displaying to a user the railcar traffic forecast data in terms of length of consist.

15. A method as defined in claim 7, wherein said GUI includes an information field displaying to a user the railcar traffic forecast data in terms of weight of consist.

16. A method as defined in claim 7, wherein said GUI includes an information field displaying to a user train block information conveyed by the railcar traffic forecast data.

17. A method as defined in claim 16, wherein the train block information conveys information about core blocks.

18. A method as defined in claim 16, wherein the train block information conveys information about filler blocks.

19. A method as defined in claim 16, wherein said GUI includes an information field displaying for at least one train block, the number of railcars in the train block.

20. A method as defined in claim 16, wherein said GUI includes an information field displaying for at least one block, the length of the train block.

21. A method as defined in claim 16, wherein said GUI is displaying for at least one train block, the weight of the train block.

22. A method as defined in claim 16, wherein said software does not assign the railcar to the particular departure train if there is not sufficient space for the railcar on the particular departure train.

23. A method as defined in claim 5, wherein said software performs a computation to forecast when a processing performed by the switchyard in connection with a railcar will be completed in assigning the railcar to a particular departure train.

24. A method as defined in claim 23, wherein the computation includes determining an expected switching time for the railcar.

25. A method as defined in claim 5, wherein said assigning includes assigning to respective departure trains railcars that have arrived in the switchyard and railcars inbound for the switchyard and yet to arrive at the switchyard.

26. A method as defined in claim 7, wherein each departure train is characterized by a scheduled departure time.

27. A method as defined in claim 26, wherein said GUI includes an information field displaying to a user a scheduled departure time of the particular departure train.

28. A method as defined in claim 26, wherein said GUI includes an information field displaying to a user current status information of the particular departure train.

29. A method as defined in claim 26, wherein said GUI includes an information field displaying to a user a departure track of the switchyard in which the particular departure train is located.

30. A method as defined in claim 26, wherein said GUI includes an information field displaying to a user the forecast of railcar traffic that would be available for the particular departure train, in terms of number of railcars.

31. A method as defined in claim 26, wherein said GUI includes an information field displaying to a user the forecast of railcar traffic that would be available for the particular departure train, in terms of length of consist.

32. A method as defined in claim 26, wherein said GUI includes an information field displaying to a user the forecast of railcar traffic that would be available for the particular departure train, in terms of weight of consist.

33. A method as defined in claim 26, wherein said GUI includes an information field displaying to a user the railcar traffic available for the particular departure train, broken down in train blocks.

34. A method as defined in claim 33, wherein said train blocks include core blocks.

35. A method as defined in claim 33, wherein said train blocks include filler blocks.

36. A method as defined in claim 33, wherein said GUI is displaying for at least one of said train blocks, the number of railcars in a train block.

37. A method as defined in claim 33, wherein said GUI is displaying for at least one of said train blocks, the length of a train block.

38. A method as defined in claim 33, wherein said GUI is displaying for at least one of said train blocks, the weight of a train block.

39. A method for forecasting the outbound workload in a switchyard including a switch and classification tracks, said method comprising:
 a. providing a data processing entity including a CPU, a machine readable storage encoded with software for execution by the CPU and an output, for:
  i. matching with the software railcars yet to be switched in the switchyard to departure trains, said matching including forecasting for a railcar the departure train that will be available to transport the railcar out of the switchyard when a processing of the railcar by the switchyard will be completed;
  ii. computing with the software a forecast of railcar traffic that will be available to individual ones of the departure trains for transport out of the switchyard at least in part on the basis of said matching, the forecast of railcar traffic in connection with a particular one of the departure trains including an identification of railcars assigned to the particular departure train;
 b. releasing from the output data describing the computed forecast of railcar traffic available for at least one of the departure trains.

* * * * *